US012748313B2

(12) United States Patent
Kim et al.

(10) Patent No.: US 12,748,313 B2
(45) Date of Patent: Sep. 29, 2026

(54) WEARABLE DEVICE AND METHOD FOR DISPLAYING VISUAL OBJECTS FOR ENTERING MULTIPLE VIRTUAL SPACES

(71) Applicant: Samsung Electronics Co., Ltd., Suwon-si (KR)

(72) Inventors: Kyunghwa Kim, Suwon-si (KR); Sunho Kim, Suwon-si (KR); Sanghyun Park, Suwon-si (KR); Giyoung Shin, Suwon-si (KR); Minseoung Woo, Suwon-si (KR); Hyunjun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/226,487

(22) Filed: Jun. 3, 2025

(65) Prior Publication Data

US 2025/0291198 A1 Sep. 18, 2025

Related U.S. Application Data

(63) Continuation of application No. PCT/KR2023/019569, filed on Nov. 30, 2023.

(30) Foreign Application Priority Data

Dec. 7, 2022 (KR) ........................ 10-2022-0169963

(51) Int. Cl.
*G02B 27/01* (2006.01)
*G02B 27/00* (2006.01)
(Continued)

(52) U.S. Cl.
CPC ..... *G02B 27/0176* (2013.01); *G02B 27/0093* (2013.01); *G02B 27/0172* (2013.01);
(Continued)

(58) Field of Classification Search
CPC ............ G02B 27/0176; G02B 27/0093; G02B 27/0172; G02B 2027/0138;
(Continued)

(56) References Cited

U.S. PATENT DOCUMENTS 10,593,105 B2 3/2020 Singh et al.
10,901,499 B2 1/2021 Joshi et al.
(Continued)

FOREIGN PATENT DOCUMENTS

CN 111475073 A 7/2020
JP 2018109835 A 7/2018
(Continued)

OTHER PUBLICATIONS

International Search Report for PCT/KR2023/019569 mailed Mar. 8, 2024, 5 pages, with English translation.
Written Opinion of the ISA for PCT/KR2023/019569 mailed Mar. 8, 2024, 3 pages.

*Primary Examiner* — Benjamin C Lee
*Assistant Examiner* — Nathan P Brittingham
(74) *Attorney, Agent, or Firm* — Nixon & Vanderhye, P.C.

(57) ABSTRACT

A processor of a wearable device may be configured to cause the wearable device to: display a first visual object corresponding to a first virtual space using a first size based on the number of applications linked to the first virtual space and a first distance related to the number of times of entering the first virtual space; display a second visual object corresponding to a second virtual space using a second size based on the number of applications linked to the second virtual space and a second distance related to the number of times of entering the second virtual space; and in response to an input of selecting one of the first visual object and the second visual object, display at least a part of a virtual space corresponding to the visual object selected by the input.

20 Claims, 14 Drawing Sheets

(51) Int. Cl.
*G06F 1/16* (2006.01)
*G06F 3/01* (2006.01)
*H04N 13/111* (2018.01)
*H04N 13/383* (2018.01)

(52) U.S. Cl.
CPC .............. *G06F 1/163* (2013.01); *G06F 3/017* (2013.01); *H04N 13/111* (2018.05); *H04N 13/383* (2018.05); *G02B 2027/0138* (2013.01); *G02B 2027/014* (2013.01); *G02B 2027/0178* (2013.01)

(58) Field of Classification Search
CPC ...... G02B 2027/014; G02B 2027/0178; H04N 13/383; H04N 13/111; G06F 1/163; G06F 3/017
See application file for complete search history.

(56) References Cited

U.S. PATENT DOCUMENTS

| | | | | |
|---|---|---|---|---|
| 11,194,438 | B2 | 12/2021 | Boesel et al. | |
| 11,210,518 | B2 | 12/2021 | Laaksonen et al. | |
| 11,442,682 | B2 | 9/2022 | Bamba et al. | |
| 2016/0180589 | A1 | 6/2016 | Bean et al. | |
| 2017/0237974 | A1* | 8/2017 | Samec | H04N 13/122 348/53 |
| 2018/0054568 | A1 | 2/2018 | Sugawara | |
| 2018/0165887 | A1 | 6/2018 | Iwai et al. | |
| 2021/0274158 | A1 | 9/2021 | Lutter et al. | |
| 2022/0261088 | A1* | 8/2022 | Pinchon | G06F 3/0482 |

FOREIGN PATENT DOCUMENTS

| | | | |
|---|---|---|---|
| JP | 2020046976 | A | 3/2020 |
| KR | 100522949 | B1 | 10/2005 |

* cited by examiner

WEARABLE DEVICE AND METHOD FOR DISPLAYING VISUAL OBJECTS FOR ENTERING MULTIPLE VIRTUAL SPACES

CROSS-REFERENCE TO RELATED APPLICATIONS

This application is a continuation of International Application No. PCT/KR2023/019569 designating the United States, filed on Nov. 30, 2023, in the Korean Intellectual Property Receiving Office and claiming priority to Korean Patent Application No. 10-2022-0169963, filed on Dec. 7, 2022, in the Korean Intellectual Property Office, the disclosures of each of which are incorporated by reference herein in their entireties.

BACKGROUND

Field

The disclosure relates to a wearable device and a method for displaying visual objects for entering a plurality of virtual spaces.

Description of Related Art

In order to provide an enhanced user experience, an electronic device that provides an augmented reality (AR) service that displays information generated by a computer in connection with an external object in a real-world are being developed. The electronic device may be a wearable device that may be worn by a user. For example, the electronic device may be AR glasses and/or a head-mounted device (HMD).

SUMMARY

According to an example embodiment, a wearable device may comprise: a sensor, a display, memory storing instructions, and at least one processor, comprising processing circuitry, wherein at least one processor, individually and/or collectively, may be configured to execute the instructions and to cause the wearable device to: display, using a first size based on a number of applications associated with a first virtual space and a first distance associated with a number of entries into the first virtual space, a first visual object corresponding to the first virtual space, in the display; display, using a second size based on a number of applications associated with a second virtual space and a second distance associated with a number of entries into the second virtual space, a second visual object corresponding to the second virtual space, in the display; and in response to an input selecting one of the first visual object or the second visual object, at least a portion of a virtual space corresponding to a visual object selected by the input, in the display.

According to an example embodiment, a method of operating a wearable device may comprise: displaying, using a first size based on a number of applications associated with a first virtual space and a first distance associated with a number of entries into the first virtual space, a first visual object corresponding to the first virtual space, in a display of the wearable device; displaying, using a second size based on a number of applications associated with a second virtual space and a second distance associated with a number of entries into the second virtual space, a second visual object corresponding to the second virtual space, in the display; and in response to an input selecting one of the first visual object or the second visual object, at least a portion of a virtual space corresponding to a visual object selected by the input, in the display.

According to an example embodiment, a wearable device may comprise a display, memory storing instructions, and at least one processor, comprising processing circuitry, individually and/or collectively, configured to execute the instructions and to cause the wearable device to: display a first virtual object provided from a first application associated with a first virtual space, in the display; in response to an input to display a list of a plurality of virtual spaces in a state displaying the first virtual object, identify a second virtual space distinguished from the first virtual space; display, based on identifying the second virtual space, a first visual object representing the first virtual space based on an image representing the first virtual object using the first distance and a second visual object representing the second virtual space using a second distance distinguished from the first distance; and in response to an input selecting one of the first visual object or the second visual object, at least a portion of a virtual space corresponding to a visual object selected by the input, in the display.

According to an example embodiment, a method of operating a wearable device may include: displaying a first virtual object provided from a first application associated with a first virtual space in a display of the wearable device; in response to an input to display a list of a plurality of virtual spaces in a state displaying the first virtual object, identifying a second virtual space distinguished from the first virtual space; based on identifying the second virtual space, displaying a first visual object representing the first virtual space based on an image representing the first virtual object using the first distance and a second visual object representing the second virtual space using a second distance distinguished from the first distance; and in response to an input selecting one of the first visual object or the second visual object, displaying at least a portion of a virtual space corresponding to a visual object selected by the input, in the display.

According to an example embodiment, a non-transitory computer-readable storage medium storing instructions may be provided. The instructions, when executed by at least one processor, comprising processing circuitry, individually and/or collectively, of a wearable device including a display, may cause the wearable device to: display, using a first size based on a number of applications associated with a first virtual space and a first distance associated with a number of entries into the first virtual space, a first visual object corresponding to the first virtual space, in the display; display, using a second size based on a number of applications associated with a second virtual space and a second distance associated with a number of entries into the second virtual space, a second visual object corresponding to the second virtual space, in the display; and in response to an input selecting one of the first visual object or the second visual object, at least a portion of a virtual space corresponding to a visual object selected by the input, in the display.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
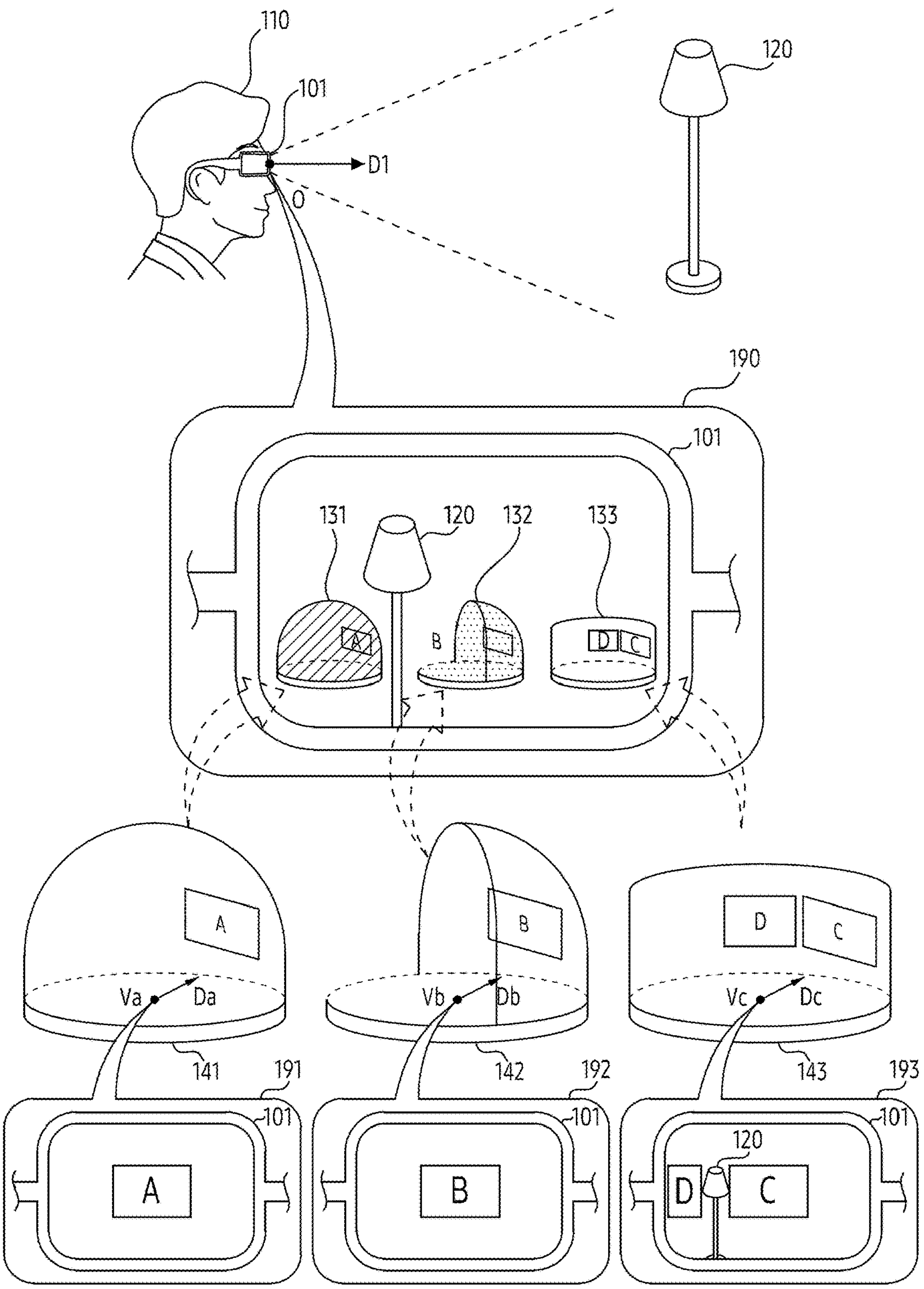
FIG. 1 is a diagram illustrating an example of displaying a visual object for a virtual space by a wearable device according to various embodiments.

Hereinafter, various example embodiments of the disclosure will be described in greater detail with reference to the accompanying drawings.

The various example embodiments of the disclosure and terms used herein are not intended to limit the technology described in the disclosure to specific embodiments, and should be understood to include various modifications, equivalents, or substitutes. In relation to the description of the drawings, a reference numeral may be used for a similar component. A singular expression may include a plural expression unless it is clearly meant differently in the context. In the disclosure, an expression such as “A or B”, “at least one of A and/or B”, “A, B or C”, or “at least one of A, B and/or C”, and the like may include all possible combinations of items listed together. Expressions such as “1st”, “2nd”, “first” or “second”, and the like may modify the corresponding components regardless of order or importance, is only used to distinguish one component from another component, but does not limit the corresponding components. When a (e.g., first) component is referred to as “connected (functionally or communicatively)” or “accessed” to another (e.g., second) component, the component may be directly connected to the other component or may be connected through another component (e.g., a third component).

The term “module” used in the disclosure may include a unit configured with hardware, software, or firmware, and may be used interchangeably with terms such as logic, logic block, component, or circuit, and the like. The module may be an integrally configured component or a minimum unit or part thereof that performs one or more functions. For example, a module may be configured with an application-specific integrated circuit (ASIC).

FIG. 1 is a diagram illustrating an example of displaying a visual object for a virtual space by a wearable device according to various embodiments. Referring to FIG. 1, a wearable device 101 may include a head-mounted display (HMD) wearable on a head of a user 110. Although an external appearance of the wearable device 101 having a shape of glasses is illustrated, the disclosure is not limited thereto. Non-limiting examples of a structure of the wearable device 101 wearable on the head of the user 110 will be described with reference to FIGS. 3A and 3B and/or 4A and 4B. One or more hardware included in the wearable device 101 will be illustrated and described in greater detail below with reference to FIG. 2.

According to an embodiment, the wearable device 101 may execute a function associated with an augmented reality (AR) and/or a mixed reality (MR). In an embodiment of FIG. 1, in a state in which the user 110 wears the wearable device 101, the wearable device 101 may include at least one lens positioned adjacent to eyes of the user 110. The wearable device 101 may couple ambient light passing through the lens with light radiated from a display of the wearable device 101. A display area of the display may be formed in the lens through which the ambient light passes. Since the wearable device 101 couples the ambient light and the light radiated from the display, the user 110 may see an image in which a real object recognized by the ambient light and a virtual object formed by the light radiated from the display are mixed.

According to an embodiment, the wearable device 101 may execute a function associated with a video see-through (VST) and/or a virtual reality (VR). Referring to FIG. 1, in a state in which the user 110 wears the wearable device 101, the wearable device 101 may include a housing covering the eyes of the user 110. The wearable device 101 may include a display positioned on a first surface facing the eyes in the state. The wearable device 101 may include a camera positioned on a second surface opposite to the first surface. Using the camera, the wearable device 101 may obtain frames including the ambient light. The wearable device 101 may cause the user 110 to recognize the ambient light through the display, by outputting the frames in the display positioned on the first surface. A display area of the display positioned on the first surface may be formed by one or more pixels included in the display. The wearable device 101 may cause the user 110 to recognize the virtual object together with the real object recognized by the ambient light, by synthesizing the virtual object in the frames output through the display.

Referring to FIG. 1, different states 190, 191, 192, and 193 of a screen displayed by the wearable device 101 according to an embodiment are illustrated. The states 190, 191, 192, and 193 may be distinguished by the number, a type, and/or a shape of virtual spaces displayed through the display of the wearable device 101. The wearable device 101 may add, delete, and/or change a virtual space by executing an application installed in the wearable device 101. According to an embodiment, the wearable device 101 may control execution of a plurality of applications as a unit of the virtual space. For example, the wearable device 101 may position a screen (e.g., screens A, B, C, and D) provided from the application in the virtual space. The virtual object included in the virtual space may include the screen and/or a widget positioned in the virtual space by the execution of the application. In the example, a set of one or more applications may be matched to the virtual space generated by the wearable device 101. The application executed by the wearable device 101 to manage one or more virtual spaces will be described in greater detail below with reference to FIG. 2.

In the state 190 of FIG. 1, the wearable device 101 may display a list of the virtual spaces in the display. In the list, the wearable device 101 may display visual objects (e.g., a first visual object 131 to a third visual object 133) representing each of virtual spaces (e.g., a first virtual space 141 to a third virtual space 143). The wearable device 101 may display the first visual object 131 in a size smaller than a size of the first virtual space 141. For example, the first visual object 131 may be referred to as a thumbnail object, a preview, a shortcut, and/or a miniature for the first virtual space 141. In the state 190 of FIG. 1, the wearable device 101 may display a second visual object 132 that is a reduced shape of a second virtual space 142. In the state 190 of FIG. 1, the wearable device 101 may display the third visual object 133 representing the third virtual space 143 in a size smaller than a size of the third virtual space 143. According to an embodiment, a shape of the first visual object 131 to the third visual object 133 displayed by the wearable device 101 will be described with reference to FIG. 5. According to an embodiment, an operation of displaying the list of the virtual spaces by the wearable device 101 will be described in greater detail below with reference to FIGS. 6A and 6B.

According to an embodiment, the wearable device 101 may output a user interface (UI) based on an AR, the VR, the VST, and/or a partial AR based on at least one virtual space. In the state 190 of displaying the list of the virtual spaces, the wearable device 101 may display an external object 120 (e.g., a floor stand) positioned in a direction D1 of the head of the user 110 in the display area based on the AR and/or the VST. For example, the wearable device 101 may show the external object 120 to the user 110, by passing external light for the external object 120 toward the eyes of the user, or by displaying an image and/or a video including the external object 120. In the state 190, an input selecting any one of the first visual object 131 to the third visual object 133 may be identified. The input may be identified by a direction of a body part such as the head, the eyes, and/or a finger of the user 110 wearing the wearable device 101. The input may be identified by an external electronic device (e.g., a remote controller) connected to the wearable device 101. The input may be identified by a touch sensor and/or one or more buttons formed in the housing of the wearable device 101.

Referring to FIG. 1, in response to an input selecting the first visual object 131 in the state 190, the wearable device 101 may switch to the state 191 to display at least a portion of the first virtual space 141 corresponding to the first visual object 131. For example, based on an input selecting the second visual object 132, the wearable device 101 may switch from the state 190 to the state 192 to provide the second virtual space 142. For example, in response to an input selecting the third visual object 133, the wearable device 101 may switch from the state 190 to the state 193 to visualize the third virtual space 143. An operation of identifying an input selecting a specific visual object in the state 190 by the wearable device 101 according to an embodiment will be described in greater detail below with reference to FIGS. 7A, 7B, and 7C.

Referring to FIG. 1, in the state 191 in which at least a portion of the first virtual space 141 is displayed, the wearable device 101 may identify a view angle from a point Va in the first virtual space 141 mapped to a location O of the user 110 facing a direction Da in the first virtual space 141 mapped to the direction D1 of the head of the user. Based on the view angle in the first virtual space 141, the wearable device 101 may select a portion of the first virtual space 141 to be displayed to the user 110 through the display. In the state 191, according to an embodiment, the wearable device 101 may render a portion of the first virtual space 141 selected by the view angle. Based on rendering of the portion of the first virtual space 141, the wearable device 101 may obtain an image and/or a video to be displayed through the display.

In an embodiment, in case that the first virtual space 141 is formed to provide the virtual reality, the wearable device 101 may block external light displayed to the user 110 in the state 191 to display the first virtual space 141. For example, in the state 191, the wearable device 101 may display a portion of the first virtual space 141 to completely block an external space such as the external object 120. In case that a screen A is positioned in the first virtual space 141, the wearable device 101 may display the screen A in the display based on whether the screen A is included in the view angle in the first virtual space 141. The screen A may be provided from a specific application installed in the wearable device 101. In order to guide that the first virtual space 141 provides the virtual reality, the wearable device 101 may display the first visual object 131 including a completely closed-curved surface. Based on a transparency of the closed-curved surface included in the first visual object 131, the wearable device 101 may guide that the first virtual space 141 provides the virtual reality. Although the first visual object 131 having a shape of a dome is illustrated, the disclosure is not limited thereto, and the wearable device 101 may display the first visual object 131 having a shape of a sphere.

Referring to FIG. 1, in the state 192 in which at least a portion of the second virtual space 142 is displayed, the wearable device 101 may select a portion of the second virtual space 142 to be displayed through the display based on a point Vb in the second virtual space 142 mapped to the location O, and a direction Db in the second virtual space 142 mapped to the direction D1. In case that a screen B is included in the second virtual space 142, the wearable device 101 may display the screen B in the display based on whether the screen B is included in a portion of the second virtual space 142 extending along the direction Db from the point Vb.

In an embodiment, in case that the second virtual space 142 is formed to partially provide AR, the wearable device 101 may block the external light displayed to the user 110 based on a condition set by the second virtual space 142 in the state 192. For example, the wearable device 101 may determine whether to display an image and/or a video representing the external light in the display, by comparing an angle and the direction D1 to provide the AR. In the state 192, in case that the direction D1 of the head of the user faces a specific direction, or the location O of the user 110 is included in a specific area (e.g., an area geographically distinguished by a global positioning system (GPS) coordinate and/or a geofence), the wearable device 101 may completely block the external light. In order to guide that the second virtual space 142 partially provides the AR, the wearable device 101 may display the second visual object 132 including a partially opened-curved surface. For example, the wearable device 101 may display the second visual object 132 including a curved surface having a shape of a dome divided in half. Using a transparency of the curved surface of the second visual object 132, the wearable device 101 may guide that the second virtual space 142 partially provides the AR. For example, the transparency of the curved surface included in the second visual object 132 may be higher than the transparency of the closed-curved surface included in the first visual object 131.

Referring to FIG. 1, in the state 193 in which at least a portion of the third virtual space 143 is displayed, the wearable device 101 may adjust a view angle in the third virtual space 143 based on a point Vc and a direction Dc corresponding to each of the location O and the direction D1 of the user 110. Based on the adjusted view angle, the wearable device 101 may display a portion of the third virtual space 143 in the display. In case that the third virtual space 143 is formed to provide the AR, the wearable device 101 may display the external object 120 in the display together with a virtual object (e.g., the screens C and D) included in the third virtual space 143. In the state 193, in case that the location O is changed by movement of the user 110, the wearable device 101 may change the view angle based on a point in the third virtual space 143 corresponding to the changed location O. In the state 193, in case that the direction D1 is changed by rotation of the user 110, the wearable device 101 may rotate the view angle based on a direction in the third virtual space 143 mapped to the changed direction D1. In order to guide that the third virtual space 143 provides the AR, the wearable device 101 may display the third visual object 133 having a shape different from a curved surface having a shape of a dome.

According to an embodiment, in a state (e.g., the states 191, 192, and 193) of selectively displaying any one of different virtual spaces (e.g., the first virtual space 141 to the third virtual space 143), the wearable device 101 may conditionally activate a camera included in the wearable device 101, based on a category of the selected virtual space. For example, in a state (e.g., the state 191 of displaying a portion of the first virtual space 141) of displaying a portion of a virtual space to provide the VR, the wearable device 101 may deactivate hardware (e.g., a camera and/or a microphone) to obtain information on the external space. For example, in a state (e.g., the state 193 of displaying a portion of the third virtual space 143) of displaying a portion of a virtual space to provide the AR, the wearable device 101 may activate the hardware to provide a user experience associated with the external space. Since the wearable device 101 conditionally activates the camera and/or the microphone, the wearable device 101 may reduce power consumed by the camera and/or the microphone. Based on the power reduction, the wearable device 101 may save electric energy of a battery and may operate independently of charging for a longer time.

As described above, according to an embodiment, the wearable device 101 may display the visual object (e.g., the first visual object 131 to the third visual object 133) having the shape of a thumbnail for the virtual space (e.g., the first virtual space 141 to the third virtual space 143) provided by the wearable device 101. The wearable device 101 may transmit information on the virtual space to the user 110, using the visual object representing a characteristic of the virtual space. For example, the wearable device 101 may guide whether the virtual space corresponding to the visual object provides which user experience among the AR, the VR, or the partial AR, using a shape (e.g., the shape of the dome and/or the sphere) and/or a transparency of the visual object. For example, the wearable device 101 may visualize at least one virtual object, by inserting an image representing the at least one virtual object included in the virtual space into the visual object. In a state in which a plurality of virtual spaces are generated, the wearable device 101 may visualize the number of entries into each of the plurality of virtual spaces and/or the number of virtual objects included in each of the plurality of virtual spaces, using a size and/or a distance (or depth, binocular parallax) of visual objects representing the plurality of virtual spaces.

Hereinafter, referring to FIG. 2, according to an example embodiment, one or more hardware included in the wearable device 101 and at least one application executed by the wearable device 101 will be described in greater detail.

Figure 2:
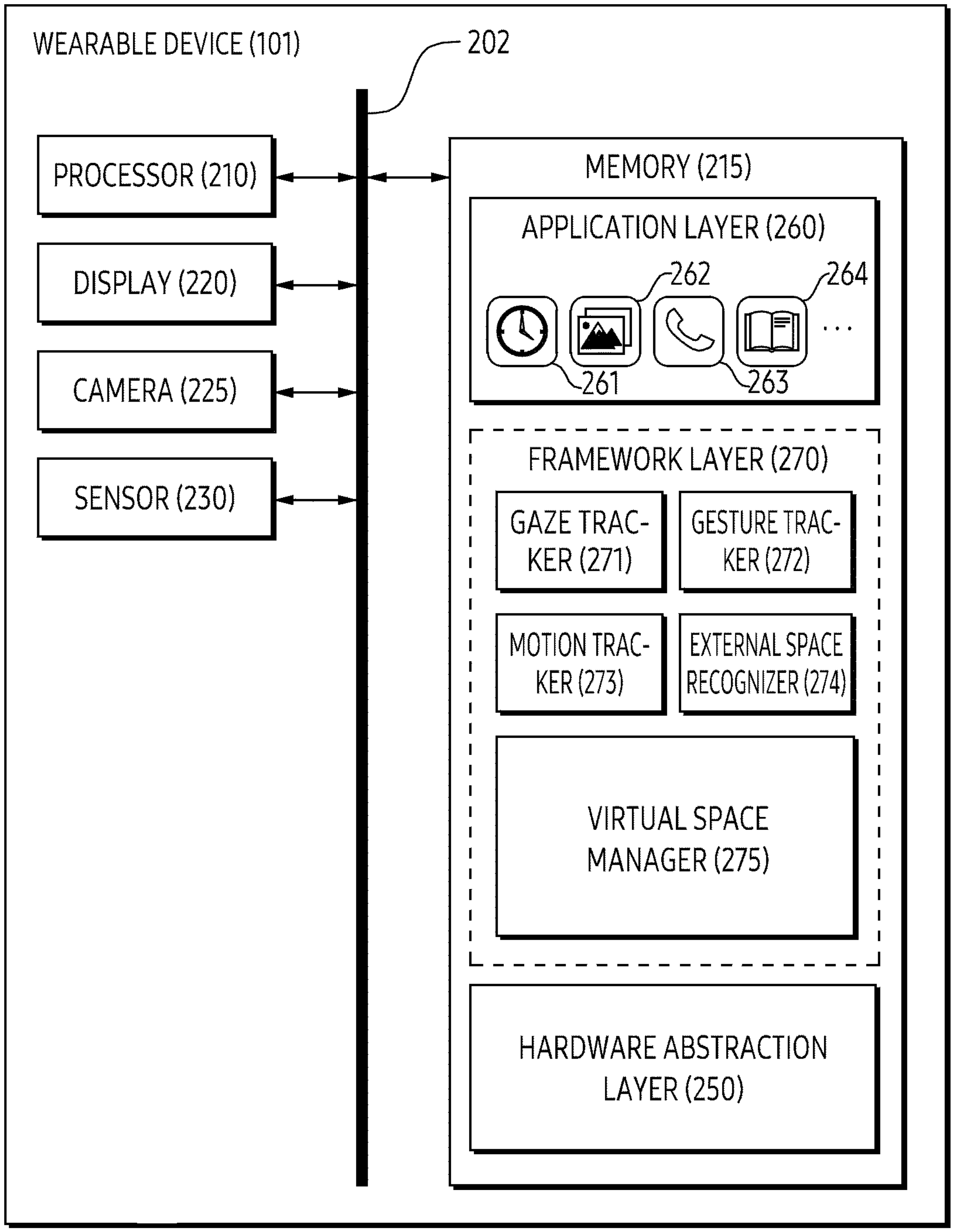
FIG. 2 is a block diagram illustrating an example configuration of a wearable device according to various embodiments.

FIG. 2 is a block diagram illustrating an example configuration of a wearable device according to various embodiments. A wearable device 101 of FIG. 2 may include the wearable device 101 of FIG. 1.

According to an embodiment, the wearable device 101 may include at least one of a processor (e.g., including processing circuitry) 210, memory 215, and/or a display 220, a camera 225, and/or a sensor 230. The processor 210, the memory 215, the display 220, the camera 225, and the sensor 230 may be electronically and/or operably coupled with each other by an electronical component such as a communication bus 202. Hereinafter, hardware being operably coupled may refer, for example, to a direct connection or an indirect connection between hardware being established by wire or wirelessly so that second hardware is controlled by first hardware among the hardware. Although illustrated based on different blocks, the disclosure is not limited thereto, and a portion (e.g., at least a portion of the processor 210 and the memory 215) of the hardware of FIG. 2 may be included in a single integrated circuit such as a system on a chip (SoC). A type and/or the number of the hardware included in the wearable device 101 is not limited as illustrated in FIG. 2. For example, the wearable device 101 may include only a portion of a hardware component illustrated in FIG. 2.

In an embodiment, the processor 210 of the wearable device 101 may include hardware to process data based on one or more instructions. For example, the hardware to process the data may include an arithmetic and logic unit (ALU), a floating point unit (FPU), a field programmable gate array (FPGA), a central processing unit (CPU), and/or an application processor (AP). The processor 210 may have a structure of a single-core processor, or have a structure of a multi-core processor such as a dual core, a quad core, a hexa core. Thus, the processor 210 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment, the memory 215 of the wearable device 101 may include a hardware component to store data and/or instruction input to or output from the processor 120 of the wearable device 101. For example, the memory 215 may include volatile memory such as random-access memory (RAM), and/or non-volatile memory such as read-only memory (ROM). For example, the volatile memory may include at least one of dynamic RAM (DRAM), static RAM (SRAM), Cache RAM, and pseudo SRAM (PSRAM). For example, the non-volatile memory may include at least one of programmable ROM (PROM), erasable PROM (EPROM), electrically erasable PROM (EEPROM), flash memory, a hard disk, a compact disk, a solid state drive (SSD), and an embedded multi media card (eMMC).

In an embodiment, the display 220 of the wearable device 101 may output visualized information (e.g., a screen of FIGS. 1, 6A to 6B, 7A, 7B, and 7C) to a user (e.g., the user 110 of FIG. 1). For example, the display 220 may output the visualized information to the user, by being controlled by the processor 210 including circuitry such as a graphic processing unit (GPU). The display 210 may include, for example, and without limitation, a flat panel display (FPD), and/or electronic paper, or the like. The FPD may include a liquid crystal display (LCD), a plasma display panel (PDP), and/or one or more light emitting diode (LED). The LED may include an organic LED (OLED). The display 220 of FIG. 2 may include at least one display 350 to be described in greater detail below with reference to FIGS. 3A and 3B and/or 4A and 4B.

In an embodiment, the camera 225 of the wearable device 101 may include one or more optical sensors (e.g., a charged coupled device (CCD) sensor and a complementary metal oxide semiconductor (CMOS) sensor) generating an electrical signal indicating a color and/or brightness of light. A plurality of optical sensors included in the camera 225 may be positioned in a shape of a 2-dimensional array. The camera 225 may generate 2-dimensional frame data corresponding to light reaching the optical sensors of the 2-dimensional array by substantially simultaneously obtaining electrical signals of each of the plurality of optical sensors. For example, photo data captured using the camera 225 may refer, for example, a 2-dimensional frame data obtained from the camera 225. For example, video data captured using the camera 225 may refer, for example, to a sequence of a plurality of 2-dimensional frame data obtained from the camera 225 according to a frame rate. The camera 225 may be positioned toward a direction in which the camera 225 receives light, and may further include flash light to output the light toward the direction. Although the camera 225 is illustrated based on a single block, the number of the cameras 225 included in the wearable device 101 is not limited to an embodiment. The wearable device 101 may include one or more cameras, such as one or more cameras 340 to be described in greater detail below with reference to FIGS. 3A and 3B and/or 4A and 4B.

According to an embodiment, the sensor 230 of the wearable device 101 may generate electronic information that may be processed by the processor 210 and/or the memory 215 of the wearable device 101 from non-electronic information associated with the wearable device 101. The information may be referred to as sensor data. The sensor 230 may include a global positioning system (GPS) sensor to detect a geographic location of the wearable device 101, an image sensor, an illumination sensor and/or a time-of-flight (ToF) sensor, and an inertial measurement unit (IMU) to detect a physical motion of the wearable device 101. The IMU included in the wearable device 101 may output data identifying a motion of the wearable device 101 along different axes (e.g., axes perpendicular to each other, such as an x-axis, a y-axis and/or a z-axis).

Although not illustrated, according to an embodiment, the wearable device 101 may include an output means to output information in a different shape other than a visualized shape. For example, the wearable device 101 may include a speaker to output an acoustic signal. For example, the wearable device 101 may include a motor to provide haptic feedback based on vibration.

Referring to an embodiment of FIG. 2, in the memory 215 of the wearable device 101, one or more instructions (or commands) indicating a calculation and/or an operation to be performed by the processor 210 of the wearable device 101 on data may be stored. A set of one or more instructions may be referred to as a program, firmware, an operating system, a process, a routine, a sub-routine, and/or an application. Hereinafter, an application being installed in an electronic device (e.g., the wearable device 101) may refer, for example, to one or more instructions provided in a shape of the application being stored in the memory 215, and the one or more applications are stored in a format (e.g., a file having an extension preset by the operating system of the wearable device 101) that is executable by a processor of the electronic device. According to an embodiment, the wearable device 101 may, for example, perform an operation of FIG. 8, by executing the one or more instructions stored in the memory 215.

Referring to FIG. 2, programs installed in the wearable device 101 may be classified as any one layer of different layers including an application layer 260, a framework layer 270, and/or a hardware abstraction layer (HAL) 250 based on a target. For example, in the hardware abstraction layer 250, programs (e.g., a driver) designed to target hardware (e.g., the display 220, the camera 225, and/or the sensor 230) of the wearable device 101 may be classified. For example, in the framework layer 270, programs (e.g., a gaze tracker 271, a gesture tracker 272, a motion tracker 273, an external space recognizer 274, and/or a virtual space manager 275) designed to target at least one of the hardware abstraction layer 250 and/or the application layer 260 may be classified. Programs classified as the framework layer 270 may provide an executable application programming interface (API) based on another program.

Referring to FIG. 2, in the application layer 260, a program designed to target a user (e.g., the user 110 of FIG. 1) controlling the wearable device 101 may be classified. For example, the program classified as the application layer 260 may include at least one of a time application 261 to execute a time-related function (e.g., an alarm), a gallery application 262 to browse media content stored in the memory 215, a call application 263 to execute a call connection-related function, and/or a word processor application 264 to edit a document. The disclosure is not limited thereto. For example, the program classified as the application layer 260 may cause execution of a function supported by programs classified as the framework layer 270, by calling the API.

Referring to FIG. 2, the wearable device 101 may process information associated with a gaze of a user wearing the wearable device 101, based on execution of the gaze tracker 271 in the framework layer 270. For example, the wearable device 101 may obtain an image including eyes of the user from the camera 225. Based on a location and/or a direction of a pupil included in the image, the wearable device 101 may identify a direction of the gaze of the user.

Referring to FIG. 2, the wearable device 101 may identify a motion of a preset body part including a hand, based on execution of the gesture tracker 272 in the framework layer 270. For example, the wearable device 101 may obtain an image and/or a video including the body part from the camera 225. Based on a motion and/or a posture of the preset body part indicated by the image and/or the video, the wearable device 101 may identify a gesture performed by the preset (e.g., specified) body part.

Referring to FIG. 2, the wearable device 101 may identify a motion of the wearable device 101, based on execution of the motion tracker 273 in the framework layer 270. In a state in which the wearable device 101 is worn by the user, a motion of the wearable device 101 may be associated with a motion of the head of the user. For example, the wearable device 101 may identify a direction of the wearable device 101 that substantially matches a direction (e.g., the direction D1 of FIG. 1) of the head. The wearable device 101 may identify the motion of the wearable device 101, based on sensor data of the sensor 230 including the IMU.

Referring to FIG. 2, the wearable device 101 may obtain information on an external space in which the wearable device 101 is included, or adjacent to the wearable device 101, based on execution of the external space recognizer 274 in the framework layer 270. The wearable device 101 may obtain the information, using the camera 225 and/or the sensor 230. Referring to FIG. 2, in a state in which the external space recognizer 274 is executed, the wearable device 101 may identify a virtual space mapped to the external space, based on the information obtained based on the external space recognizer 274. Based on the execution of the external space recognizer 274, the wearable device 101 may identify a location and/or a direction of the wearable device 101 in the external space. For example, based on the execution of the external space recognizer 274 and/or the motion tracker 273, the wearable device 101 may perform simultaneous localization and mapping (SLAM) to recognize the external space and the location of the wearable device 101 in the external space.

Referring to FIG. 2, the wearable device 101 may manage one or more virtual spaces (e.g., the first virtual space 141 to the third virtual space 143 of FIG. 1), based on execution of the virtual space manager 275 in the framework layer 270. For example, in a state in which the virtual space manager 275 is executed, the wearable device 101 may perform adding, deleting, and/or changing information for visualization (e.g., rendering) of a virtual space. The wearable device 101 may visualize a list of at least one virtual space managed by the wearable device 101 based on the execution of the virtual space manager 275, as in the state 190 of FIG. 1. The visualized list may include a thumbnail object representing a characteristic of a virtual space, such as the first visual object 131 to the third visual object 133 of FIG. 1. Based on an input selecting one virtual space in the list, the wearable device 101 may enter the virtual space selected by the input. For example, the wearable device 101 may display at least a portion of the virtual space selected by the input in the display 220. In the state in which the virtual space manager 275 is executed, the wearable device 101 may execute a function switching between a plurality of virtual spaces based on the list.

According to an embodiment, the wearable device 101 may align visual objects representing the virtual spaces in the display, based on the execution of the virtual space manager 275. The wearable device 101 may be aligned along at least one axis in the display 220. The wearable device 101 may adjust a shape and/or a size of a visual object displayed in the display 220, using a characteristic of a virtual space. The wearable device 101 may align a distance (or a depth) of the visual object displayed in the display 220, based on a distance indicating the number of entries into the virtual space. For example, the wearable device 101 may determine a layout of a visual object corresponding to a virtual space, based on a characteristics of the virtual space distinguished according to a category illustrated in Table 1.

TABLE 1

| Category | Type | Layout |
|---|---|---|
| User Experience | AR | Curved surface with 100% transparency |
| | VR | Closed-curved surface (in a shape of a dome or a sphere) with 20% transparency |
| | Partial AR (or partial VR, partial VST) | Partially opened-curved surface |
| Number and/or type of application | idle (<1 application) | First size |
| | 1 extended reality (XR) application | Second size (> first size) |
| | 2 XR application | Third size (> second size) |
| | 3 XR application | Fourth size (> third size) |
| | XR application and widget | Fifth size (> fourth size) |
| | Immersive application | Sixth size (> fifth size) |
| Whether to play background | Playing background | Include light source of first brightness |
| | Stop background playback | No light source |
| Execution frequency | Only application executed less than or equal to average is connected | First distance |
| | Application executed greater than or equal to average is connected | Second distance less than first distance |

According to an embodiment, an example in which the wearable device 101 displays a visual object having a layout of Table 1 will be described in greater detail below with reference to FIGS. 6B, 7A, 7B, and 7C. Referring to Table 1, a transparency of a curved surface associated with an outline of a visual object may be associated with whether a virtual space corresponding to the visual object requires information on the external space, based on the AR, the VR, and/or the partial AR. The transparency of Table 1 may be associated with whether to activate the camera 225 of the wearable device 101. Referring to Table 1, a size of a visual object may be adjusted by the number and/or a type (e.g., an application that provides a virtual space dedicated by an application, such as an immersive application) of an application matched to the virtual space corresponding to the visual object. Referring to Table 1, a light source included in the visual object may guide whether an application executed based on the virtual space corresponding to the visual object is executed in a background state (e.g., a state distinct from a foreground state displayed through the display 220). Referring to Table 1, a distance (or a depth, a binocular parallax) at which a visual object is displayed may be associated with the number of entries into a virtual space corresponding to the visual object, and/or an execution frequency of an application connected to the virtual space.

According to an embodiment, the wearable device 101 may insert a virtual object (e.g., a screen, a window, and/or a widget) provided from an application into any one of a plurality of virtual spaces, based on execution of the application classified as the application layer 260 in a state in which the virtual space manager 275 is executed. For example, the wearable device 101 may insert the virtual object into one virtual space currently being displayed through the display 220. In case that an application executed by the processor 210 is terminated, the wearable device 101 may remove a virtual object corresponding to the application from a virtual space, based on the virtual space manager 275.

According to an embodiment, the wearable device 101 may switch a state of the camera 225 from an active state or an inactive state based on the execution of the virtual space manager 275. The active state of the camera 225 may include a state of periodically or repeatedly obtaining frame data, by controlling the camera 225. The active state of camera 225 may include a state in which a voltage exceeding a preset voltage is applied to the camera 225. The inactive state of the camera 225 may include a state in which a voltage less than the preset voltage is applied to the camera 225. The inactive state of the camera 225 may include a state in which the camera 225 is controlled to at least temporarily cease an output of frame data. For example, the wearable device 101 may maintain the state of the camera 225 as the inactive state with respect to a virtual space that is used independently of information on the external space identified using the camera 225, such as the VR. For example, the wearable device 101 may switch the state of the camera 225 to the active state with respect to a virtual space in which the information on the external space identified using the camera 225 is used, such as the AR and/or the VST. Based on the frame data obtained from the camera 225 in the active state, the wearable device 101 may display an UI based on the AR and/or the VST in the display 220.

As described above, according to an embodiment, the wearable device 101 may allocate applications executed by the processor 210 to a plurality of virtual spaces. Based on a set of at least one application for a specific virtual space, the wearable device 101 may determine a size and/or a layout of a visual object representing the specific virtual space. The wearable device 101 may change a distance between a plurality of visual objects representing the plurality of virtual spaces, based on a history displaying the plurality of virtual spaces. For example, in case that the number of entries into a first virtual space is greater than the number of entries into a second virtual space, the wearable device 101 may change a distance of a first visual object corresponding to the first virtual space to be less than a distance of a second visual object corresponding to the second virtual space. The wearable device 101 may change the distance and/or a binocular parallax of the first visual object displayed in the display 220, based on the distance.

Hereinafter, example form factors of the wearable device 101 according to various embodiments will be described in greater detail below with reference to FIGS. 3A and 3B and/or 4A and 4B.

Figure 3A:
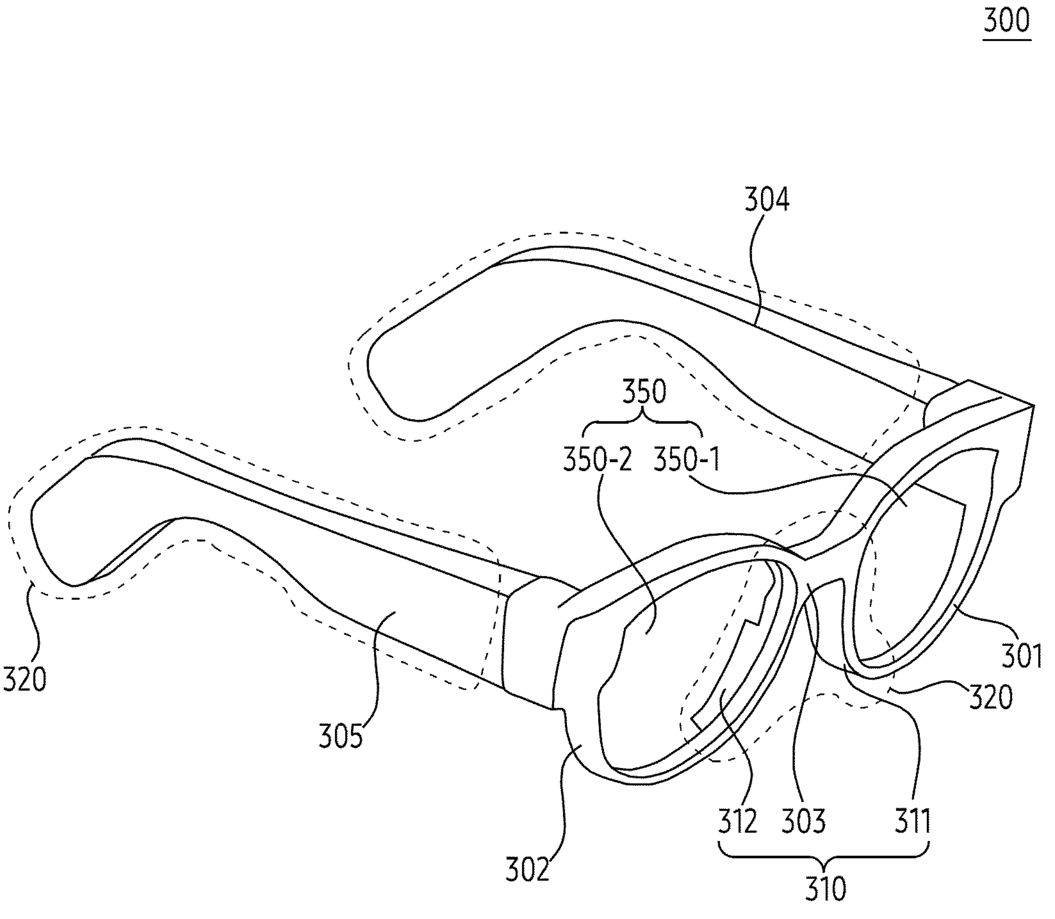
FIG. 3A is a perspective view illustrating an example wearable device according to various embodiments.

FIG. 3A is a perspective view illustrating an example wearable device according to various embodiments. FIG. 3B is a perspective view illustrating an example configuration of example hardware disposed in the wearable device 300 according to various embodiments. A wearable device 300 of FIGS. 3A and 3B may include the wearable device 101 of FIGS. 1 and 2. As shown in FIG. 3A, according to an embodiment, the wearable device 300 may include at least one display 350 and a frame supporting the at least one display 350.

According to an embodiment, the wearable device 300 may be wearable on a portion of the user's body. The wearable device 300 may provide augmented reality (AR), virtual reality (VR), or mixed reality (MR) combining the augmented reality and the virtual reality to a user wearing the wearable device 300. For example, the wearable device 300 may output a virtual reality image through at least one display 350, in response to a user's preset gesture obtained through a motion recognition camera 340-2 of FIG. 3B.

According to an embodiment, the at least one display 350 in the wearable device 300 may provide visual information to a user. The at least one display 350 may include the display 220 of FIG. 2. For example, the at least one display 350 may include a transparent or translucent lens. The at least one display 350 may include a first display 350-1 and/or a second display 350-2 spaced apart from the first display 350-1. For example, the first display 350-1 and the second display 350-2 may be disposed at positions corresponding to the user's left and right eyes, respectively.

Figure 3B:
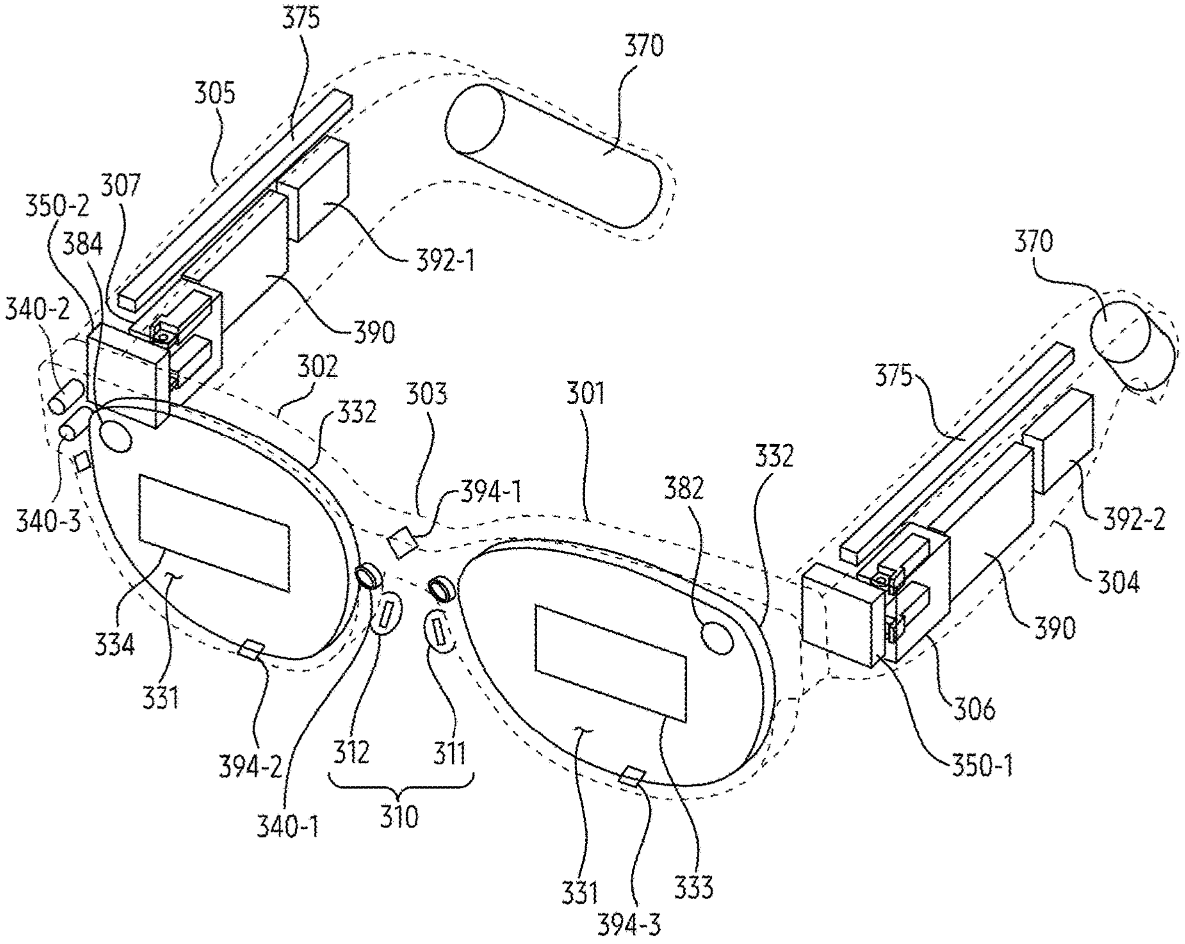
FIG. 3B is a perspective view illustrating an example configuration of hardware positioned in a wearable device according to various embodiments.

Referring to FIG. 3B, the at least one display 350 may form a display area on the lens to provide a user wearing the wearable device 300 with visual information included in ambient light passing through the lens and other visual information distinct from the visual information. The lens may be formed based on at least one of a fresnel lens, a pancake lens, or a multi-channel lens. The display area formed by the at least one display 350 may be formed on the second surface 332 of the first surface 331 and the second surface 332 of the lens. When the user wears the wearable device 300, ambient light may be transmitted to the user by being incident on the first surface 331 and being penetrated through the second surface 332. For another example, the at least one display 350 may display a virtual reality image to be combined with a reality screen transmitted through ambient light. The virtual reality image output from the at least one display 350 may be transmitted to eyes of the user, through one or more hardware (e.g., optical devices 382 and 384, and/or at least one waveguides 333 and 334) included in the wearable device 300.

According to an embodiment, the wearable device 300 may include waveguides 333 and 334 that transmit light transmitted from the at least one display 350 and relayed by the at least one optical device 382 and 384 by diffracting to the user. The waveguides 333 and 334 may be formed based on at least one of glass, plastic, or polymer. A nano pattern may be formed on at least a portion of the outside or inside of the waveguides 333 and 334. The nano pattern may be formed based on a grating structure having a polygonal or curved shape. Light incident to an end of the waveguides 333 and 334 may be propagated to another end of the waveguides 333 and 334 by the nano pattern. The waveguides 333 and 334 may include at least one of at least one diffraction element (e.g., a diffractive optical element (DOE), a holographic optical element (HOE)), and a reflection element (e.g., a reflection mirror). For example, the waveguides 333 and 334 may be disposed in the wearable device 300 to guide a screen displayed by the at least one display 350 to the user's eyes. For example, the screen may be transmitted to the user's eyes through total internal reflection (TIR) generated in the waveguides 333 and 334.

According to an embodiment, the wearable device 300 may analyze an object included in a real image collected through a photographing camera 340-1, combine with a virtual object corresponding to an object that become a subject of augmented reality provision among the analyzed object, and display on the at least one display 350. The virtual object may include at least one of text and images for various information associated with the object included in the real image. The wearable device 300 may analyze the object based on a multi-camera such as a stereo camera. For the object analysis, the wearable device 300 may execute time-of-flight (ToF) and/or simultaneous localization and mapping (SLAM) supported by the multi-camera. The user wearing the wearable device 300 may watch an image displayed on the at least one display 350.

According to an embodiment, a frame may be configured with a physical structure in which the wearable device 300 may be worn on the user's body. According to an embodiment, the frame may be configured so that when the user wears the wearable device 300, the first display 350-1 and the second display 350-2 may be positioned corresponding to the user's left and right eyes. The frame may support the at least one display 350. For example, the frame may support the first display 350-1 and the second display 350-2 to be positioned at positions corresponding to the user's left and right eyes.

Referring to FIG. 3A, according to an embodiment, the frame may include an area 320 at least partially in contact with the portion of the user's body in case that the user wears the wearable device 300. For example, the area 320 of the frame in contact with the portion of the user's body may include an area in contact with a portion of the user's nose, a portion of the user's ear, and a portion of the side of the user's face that the wearable device 300 contacts. According to an embodiment, the frame may include a nose pad 310 that is contacted on the portion of the user's body. When the wearable device 300 is worn by the user, the nose pad 310 may be contacted on the portion of the user's nose. The frame may include a first temple 304 and a second temple 305, which are contacted on another portion of the user's body that is distinct from the portion of the user's body.

According to an embodiment, the frame may include a first rim 301 surrounding at least a portion of the first display 350-1, a second rim 302 surrounding at least a portion of the second display 350-2, a bridge 303 disposed between the first rim 301 and the second rim 302, a first pad 311 disposed along a portion of the edge of the first rim 301 from one end of the bridge 303, a second pad 312 disposed along a portion of the edge of the second rim 302 from the other end of the bridge 303, the first temple 304 extending from the first rim 301 and fixed to a portion of the wearer's ear, and the second temple 305 extending from the second rim 302 and fixed to a portion of the ear opposite to the ear. The first pad 311 and the second pad 312 may be in contact with the portion of the user's nose, and the first temple 304 and the second temple 305 may be in contact with a portion of the user's face and the portion of the user's ear. The temples 304 and 305 may be rotatably connected to the rim through hinge units 306 and 307 of FIG. 3B. The first temple 304 may be rotatably connected with respect to the first rim 301 through the first hinge unit 306 disposed between the first rim 301 and the first temple 304. The second temple 305 may be rotatably connected with respect to the second rim 302 through the second hinge unit 307 disposed between the second rim 302 and the second temple 305. According to an embodiment, the wearable device 300 may identify an external object (e.g., a user's fingertip) touching the frame and/or a gesture performed by the external object using a touch sensor, a grip sensor, and/or a proximity sensor formed on at least a portion of the surface of the frame.

According to an embodiment, the wearable device 300 may include hardware (e.g., hardware described above based on the block diagram of FIG. 2) that performs various functions. For example, the hardware may include a battery module 370, an antenna module 375, optical devices 382 and 384, speakers 392-1 and 392-2, microphones 394-1, 394-2, and 394-3, a depth sensor module (not illustrated), and/or a printed circuit board 390. Various hardware may be disposed in the frame.

According to an embodiment, the microphones 394-1, 394-2, and 394-3 of the wearable device 300 may obtain a sound signal, by being disposed on at least a portion of the frame. The first microphone 394-1 disposed on the nose pad 310, the second microphone 394-2 disposed on the second rim 302, and the third microphone 394-3 disposed on the first rim 301 are illustrated in FIG. 3B, but the number and disposition of the microphone 394 are not limited to an embodiment of FIG. 3B. In a case that the number of the microphone 394 included in the wearable device 300 is two or more, the wearable device 300 may identify a direction of the sound signal using a plurality of microphones disposed on different portions of the frame.

According to an embodiment, the optical devices 382 and 384 may transmit a virtual object transmitted from the at least one display 350 to the wave guides 333 and 334. For example, the optical devices 382 and 384 may be projectors. The optical devices 382 and 384 may be disposed adjacent to the at least one display 350 or may be included in the at least one display 350 as a portion of the at least one display 350. The first optical device 382 may correspond to the first display 350-1, and the second optical device 384 may correspond to the second display 350-2. The first optical device 382 may transmit light output from the first display 350-1 to the first waveguide 333, and the second optical device 384 may transmit light output from the second display 350-2 to the second waveguide 334.

In an embodiment, a camera 340 may include an eye tracking camera (ET CAM) 340-1, a motion recognition camera 340-2 and/or the photographing camera 340-3. The photographing camera 340-3, the eye tracking camera 340-1, and the motion recognition camera 340-2 may be disposed at different positions on the frame and may perform different functions. The photographing camera 340-3, the eye tracking camera 340-1, and the motion recognition camera 340-2 may be an example of the camera 225 of FIG. 2. The eye tracking camera 340-1 may output data indicating a gaze of the user wearing the wearable device 300. For example, the wearable device 300 may detect the gaze from an image including the user's pupil, obtained through the eye tracking camera 340-1. An example in which the eye tracking camera 340-1 is disposed toward the user's right eye is illustrated in FIG. 3B, but the disclosure is not limited thereto, and the eye tracking camera 340-1 may be disposed alone toward the user's left eye or may be disposed toward two eyes.

In an embodiment, the photographing camera 340-3 may photograph a real image or background to be matched with a virtual image in order to implement the augmented reality or mixed reality content. The photographing camera may photograph an image of a specific object existing at a position viewed by the user and may provide the image to the at least one display 350. The at least one display 350 may display one image in which a virtual image provided through the optical devices 382 and 384 is overlapped with information on the real image or background including the image of the specific object obtained using the photographing camera. In an embodiment, the photographing camera may be disposed on the bridge 303 disposed between the first rim 301 and the second rim 302.

In an embodiment, the eye tracking camera 340-1 may implement a more realistic augmented reality by matching the user's gaze with the visual information provided on the at least one display 350, by tracking the gaze of the user wearing the wearable device 300. For example, when the user looks at the front, the wearable device 300 may naturally display environment information associated with the user's front on the at least one display 350 at a position where the user is positioned. The eye tracking camera 340-1 may be configured to capture an image of the user's pupil in order to determine the user's gaze. For example, the eye tracking camera 340-1 may receive gaze detection light reflected from the user's pupil and may track the user's gaze based on the position and movement of the received gaze detection light. In an embodiment, the eye tracking camera 340-1 may be disposed at a position corresponding to the user's left and right eyes. For example, the eye tracking camera 340-1 may be disposed in the first rim 301 and/or the second rim 302 to face the direction in which the user wearing the wearable device 300 is positioned.

The motion recognition camera 340-2 may provide a specific event to the screen provided on the at least one display 350 by recognizing the movement of the whole or portion of the user's body, such as the user's torso, hand, or face. The motion recognition camera 340-2 may obtain a signal corresponding to motion by recognizing the user's gesture, and may provide a display corresponding to the signal to the at least one display 350. A processor may identify a signal corresponding to the operation and may perform a preset function based on the identification. In an embodiment, the motion recognition camera 340-2 may be disposed on the first rim 301 and/or the second rim 302.

According to an embodiment, the camera 340 included in the wearable device 300 is not limited to the above-described eye tracking camera 340-1 and the motion recognition camera 340-2. For example, the wearable device 300 may identify an external object included in the FoV using a photographing camera 340-3 disposed toward the user's FoV. The wearable device 300 identifying the external object may be performed based on a sensor for identifying a distance between the wearable device 300 and the external object, such as a depth sensor and/or a time of flight (ToF) sensor. The camera 340 disposed toward the FoV may support an autofocus function and/or an optical image stabilization (OIS) function. For example, in order to obtain an image including a face of the user wearing the wearable device 300, the wearable device 300 may include the camera 340 (e.g., a face tracking (FT) camera) disposed toward the face.

Although not illustrated, the wearable device 300 according to an embodiment may further include a light source (e.g., LED) that emits light toward a subject (e.g., user's eyes, face, and/or an external object in the FoV) photographed using the camera 340. The light source may include an LED having an infrared wavelength. The light source may be disposed on at least one of the frame, and the hinge units 306 and 307.

According to an embodiment, the battery module 370 may supply power to electronic components of the wearable device 300. In an embodiment, the battery module 370 may be disposed in the first temple 304 and/or the second temple 305. For example, the battery module 370 may be a plurality of battery modules 370. The plurality of battery modules 370, respectively, may be disposed on each of the first temple 304 and the second temple 305. In an embodiment, the battery module 370 may be disposed at an end of the first temple 304 and/or the second temple 305.

In an embodiment, the antenna module 375 may transmit the signal or power to the outside of the wearable device 300 or may receive the signal or power from the outside. The antenna module 375 may be electrically and/or operably connected to communication circuitry in the wearable device 300. In an embodiment, the antenna module 375 may be disposed in the first temple 304 and/or the second temple 305. For example, the antenna module 375 may be disposed close to one surface of the first temple 304 and/or the second temple 305.

The speakers 392-1 and 392-2 may output a sound signal to the outside of the wearable device 300. A sound output module may be referred to as a speaker. In an embodiment, the speakers 392-1 and 392-2 may be disposed in the first temple 304 and/or the second temple 305 in order to be disposed adjacent to the ear of the user wearing the wearable device 300. For example, the wearable device 300 may include a second speaker 392-2 disposed adjacent to the user's left ear by being disposed in the first temple 304, and a first speaker 392-1 disposed adjacent to the user's right ear by being disposed in the second temple 305.

The light emitting module (not illustrated) may include at least one light emitting element. The light emitting module may emit light of a color corresponding to a specific state or may emit light through an operation corresponding to the specific state in order to visually provide information on a specific state of the wearable device 300 to the user. For example, when the wearable device 300 requires charging, it may emit repeatedly red light at a designated time. In an embodiment, the light emitting module may be disposed on the first rim 301 and/or the second rim 302.

Referring to FIG. 3B, according to an embodiment, the wearable device 300 may include the printed circuit board (PCB) 390. The PCB 390 may be included in at least one of the first temple 304 or the second temple 305. The PCB 390 may include an interposer disposed between at least two sub PCBs. On the PCB 390, one or more hardware (e.g., hardware illustrated by blocks described above with reference to FIG. 2) included in the wearable device 300 may be disposed. The wearable device 300 may include a flexible PCB (FPCB) for interconnecting the hardware.

According to an embodiment, the wearable device 300 may include at least one of a gyro sensor, a gravity sensor, and/or an acceleration sensor for detecting the posture of the wearable device 300 and/or the posture of a body part (e.g., a head) of the user wearing the wearable device 300. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 300 may identify the user's motion and/or gesture performed to execute or stop a specific function of the wearable device 300 based on the IMU.

Figure 4A:
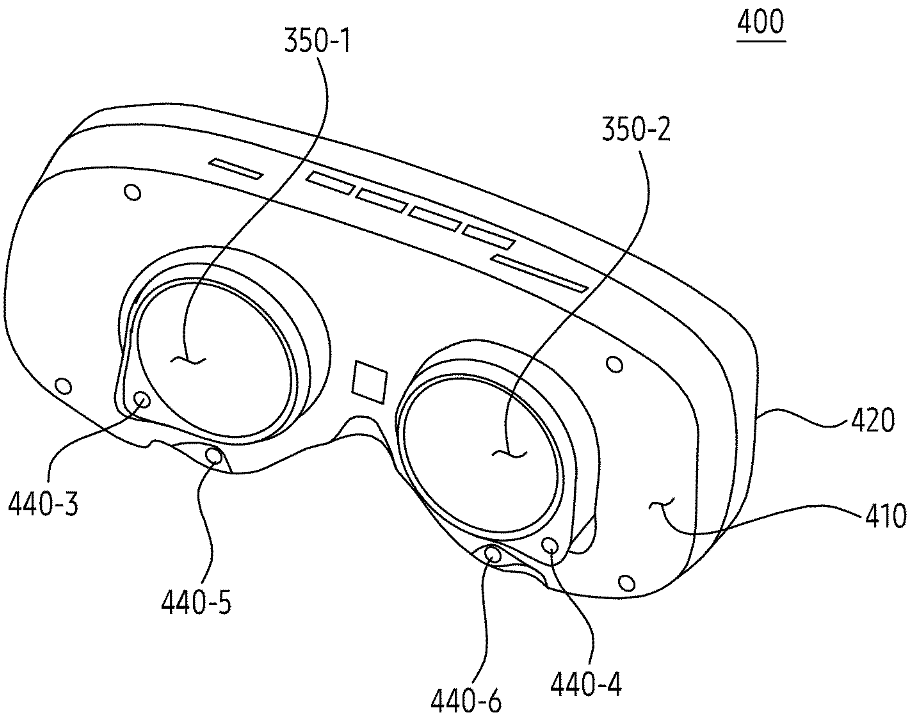
FIGS. 4A and 4B are perspective views illustrating an exterior of an example wearable device according to various embodiments.
Figure 4B:
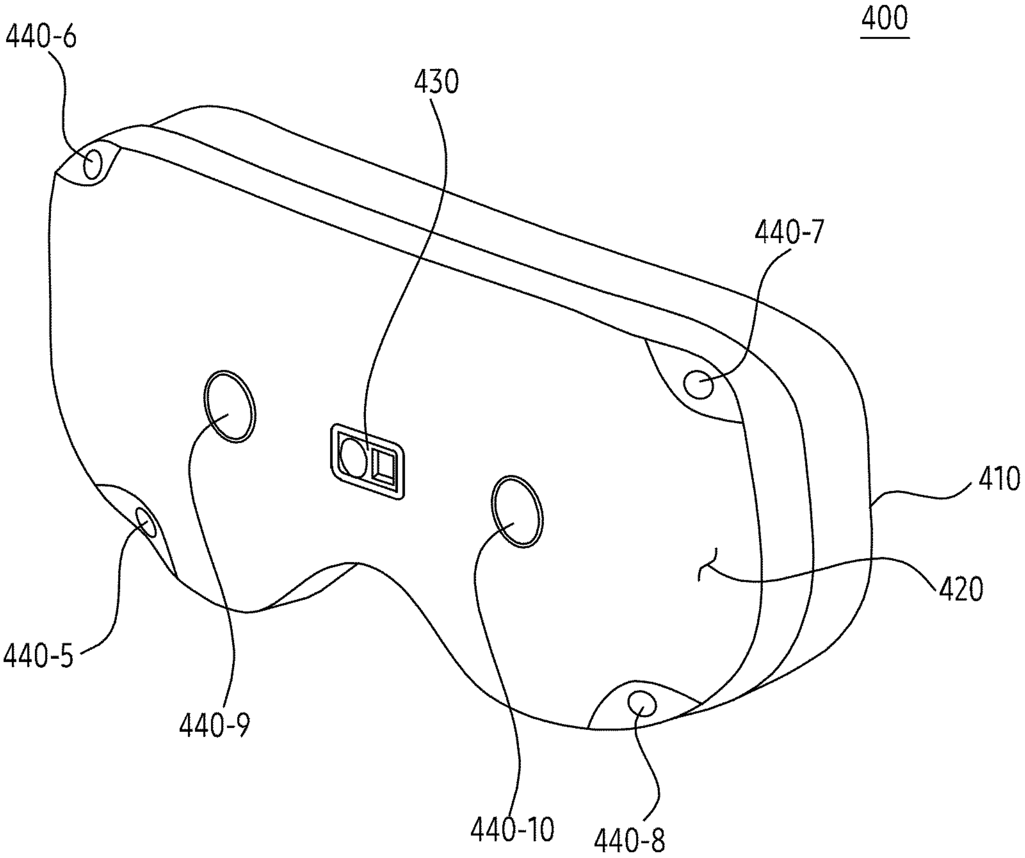

FIGS. 4A and 4B are perspective views illustrating an exterior of an example wearable device 400 according to various embodiments. A wearable device 400 of FIGS. 4A and 4B may include the wearable device 101 of FIGS. 1 and 2. According to an embodiment, an example of an exterior of a first surface 410 of a housing of the wearable device 400 may be illustrated in FIG. 4A, and an example of an exterior of a second surface 420 opposite to the first surface 410 may be illustrated in FIG. 4B.

Referring to FIG. 4A, according to an embodiment, the first surface 410 of the wearable device 400 may have an attachable shape on the user's body part (e.g., the user's face). Although not illustrated, the wearable device 400 may further include a strap for being fixed on the user's body part, and/or one or more temples (e.g., the first temple 304 and/or the second temple 305 of FIGS. 3A to 3B). A first display 350-1 for outputting an image to the left eye among the user's two eyes and a second display 350-2 for outputting an image to the right eye among the user's two eyes may be disposed on the first surface 410. The wearable device 400 may further include rubber or silicon packing, which are formed on the first surface 410, for preventing and/or reducing interference by light (e.g., ambient light) different from the light emitted from the first display 350-1 and the second display 350-2.

According to an embodiment, the wearable device 400 may include cameras 440-1 and 440-2 for photographing and/or tracking two eyes of the user adjacent to each of the first display 350-1 and the second display 350-2. The cameras 440-1 and 440-2 may be referred to as the ET camera. According to an embodiment, the wearable device 400 may include cameras 440-3 and 440-4 for photographing and/or recognizing the user's face. The cameras 440-3 and 440-4 may be referred to as a FT camera.

Referring to FIG. 4B, a camera (e.g., cameras 440-5, 440-6, 440-8, 440-8, 440-9, and 440-10), and/or a sensor (e.g., the depth sensor 430) for obtaining information associated with the external environment of the wearable device 400 may be disposed on the second surface 420 opposite to the first surface 410 of FIG. 4A. For example, the cameras 440-5, 440-6, 440-7, 440-8, 440-9, and 440-10 may be disposed on the second surface 420 in order to recognize an external object distinct from the wearable device 400. For example, using cameras 440-9 and 440-10, the wearable device 400 may obtain an image and/or video to be transmitted to each of the user's two eyes. The camera 440-9 may be disposed on the second surface 420 of the wearable device 400 to obtain a frame to be displayed through the second display 350-2 corresponding to the right eye among the two eyes. The camera 440-10 may be disposed on the second surface 420 of the wearable device 400 to obtain an image to be displayed through the first display 350-1 corresponding to the left eye among the two eyes.

According to an embodiment, the wearable device 400 may include the depth sensor 430 disposed on the second surface 420 in order to identify a distance between the wearable device 400 and the external object. Using the depth sensor 430, the wearable device 400 may obtain spatial information (e.g., a depth map) about at least a portion of the FoV of the user wearing the wearable device 400.

Although not illustrated, a microphone for obtaining sound output from the external object may be disposed on the second surface 420 of the wearable device 400. The number of microphones may be one or more, according to embodiments.

As described above, according to an embodiment, the wearable device 400 may have a form factor for being worn on a head of the user. The wearable device 400 may provide a user experience associated with an augmented reality or a virtual reality, based on a virtual space displayed on the at least one display 350 in a state of being worn on the head. The wearable device 400 may activate or deactivate the cameras 440-9 and 440-10, based on a characteristic of the virtual space displayed through the at least one display 350. The wearable device 400 may display a UI to switch between a plurality of virtual spaces managed by the wearable device 400 on the at least one display 350.

Hereinafter, according to an embodiment, an example of a visual object displayed by the wearable device 101 on the at least one display 350 will be described in greater detail with reference to FIG. 5.

Figure 5:
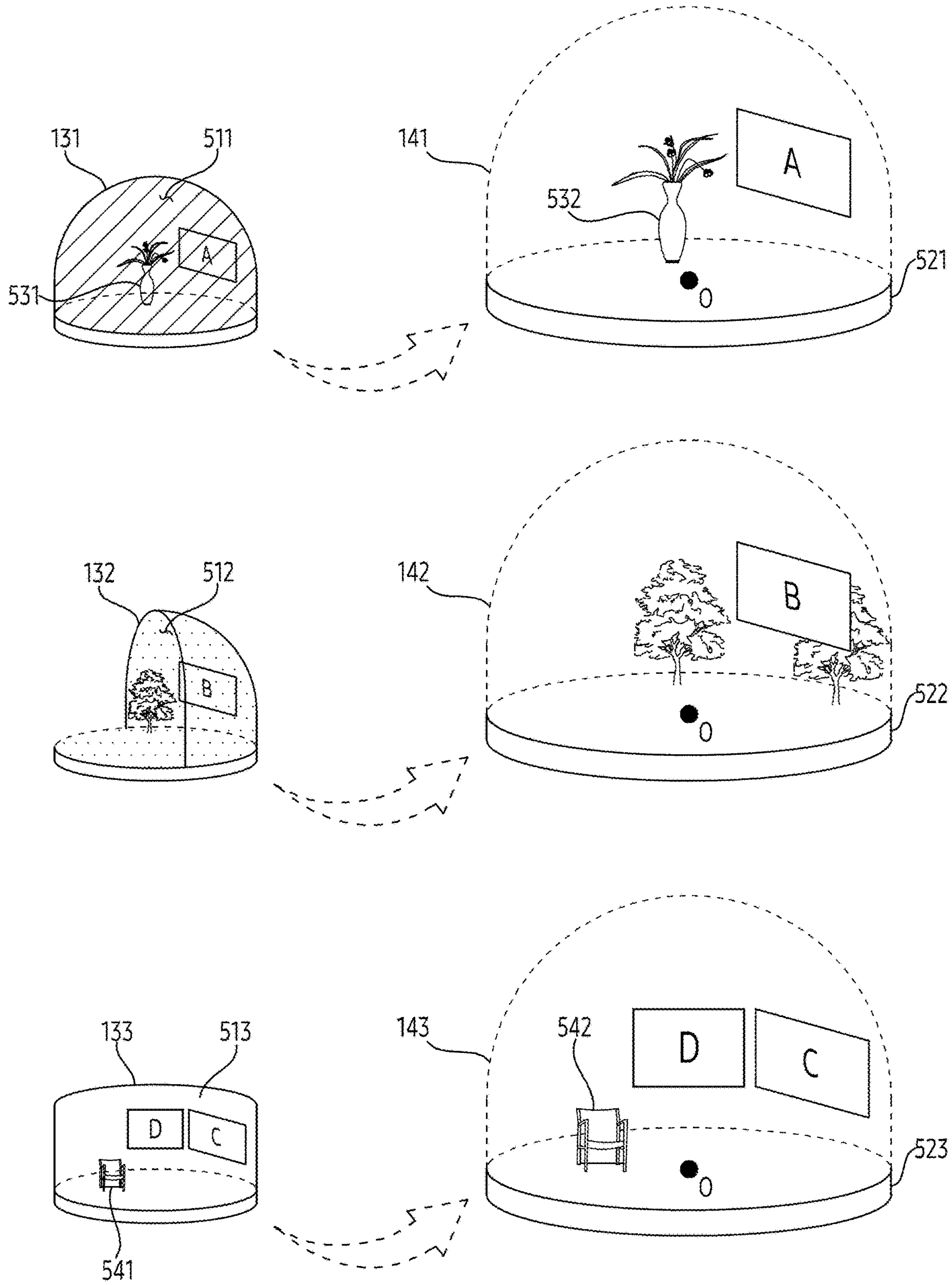
FIG. 5 is a diagram illustrating an example of virtual spaces provided by a wearable device according to various embodiments.

FIG. 5 is a diagram illustrating an example of virtual spaces (e.g., a first virtual space 141 to a third virtual space 143) provided by a wearable device according to various embodiments. The wearable device 101 of FIG. 1 to FIG. 2 may include the wearable device of FIG. 5. An operation of the wearable device described with reference to FIG. 5 may be performed by the wearable device 101 and/or the processor 210 of FIG. 2.

Referring to FIG. 5, the first virtual space 141 to the third virtual space 143 are illustrated. It is assumed that the first virtual space 141 is formed to display a screen different from an external space to a user based on a VR. It is assumed that the second virtual space 142 is formed to display a screen switchable between an AR or the VR based on a partial AR. It is assumed that the third virtual space 143 is formed to display a screen associated with the external space based on the AR.

According to an embodiment, the wearable device may obtain information to render the first virtual space 141 to the third virtual space 143. The information may be obtained based on execution of the virtual space manager 275 of FIG. 2. The wearable device may position at least one virtual object in the first virtual space 141 based on execution of an application. Referring to FIG. 5, the wearable device may position a screen A and a virtual object 532 provided from an application in the first virtual space 141. The screen A being positioned in the first virtual space 141 may include an operation in which the wearable device obtains coordinate values indicating a location of the screen A based on a coordinate system (e.g., a 3-dimensional coordinate system) of the first virtual space 141. Similarly, the wearable device may obtain coordinate values of the virtual object 532 in the first virtual space 141. The coordinate values may indicate a coordinate of a virtual object with respect to an origin O in the first virtual space 141.

According to an embodiment, the wearable device may generate and/or display a first visual object 131 that is a thumbnail object of the first virtual space 141. The first visual object 131 may be generated and/or displayed based on an input to display a list of virtual spaces generated by the wearable device. The wearable device may generate the first visual object 131 representing a characteristic of the first virtual space 141 based on the layout of Table 1. For example, with respect to the first virtual space 141 formed to display a screen different from the external space to the user based on the VR, the wearable device may set a transparency of a closed-curved surface 511 in the first visual object 131 as a preset transparency (e.g., 20% transparency of Table 1) indicating that it is a virtual space for the VR. In the example, the wearable device may set a shape of the closed-curved surface 511 in the first visual object 131 as a shape of a dome or a sphere. Referring to FIG. 5, the first visual object 131 having a shape of a dome distinguished by a reference surface 521 including the origin O of the first virtual space 141 is illustrated, but the disclosure is not limited thereto. In the closed-curved surface 511, the wearable device may at least partially display a virtual object (e.g., the screen A and/or the virtual object 532) in the first virtual space 141. For example, in the first visual object 131, the wearable device may display an image 531 representing the virtual object 532 in the first virtual space 141 as overlapping with the closed-curved surface 511.

According to an embodiment, the wearable device may generate and/or display a second visual object 132 that is a thumbnail object of the second virtual space 142. The wearable device may display the second visual object 132 including a window (e.g., a screen B) provided from an application associated with the second virtual space 142 or a closed-curved surface 512 in which an image for a widget is positioned. For example, with respect to the second virtual space 142 formed to display a switchable screen between the AR or the VR to the user based on the partial AR, the wearable device may set a transparency of the closed-curved surface 512 in the second visual object 132 as a transparency (e.g., greater than 20% and less than 100% transparency) indicating that it is a virtual space for the partial AR. The wearable device may set a shape of the closed-curved surface 512 in a shape of a partially opened dome or sphere. Referring to FIG. 5, the second visual object 132 having a shape of a dome including a reference surface 522 on which the origin O of the second virtual space 142 is positioned is illustrated, but the disclosure is not limited thereto. The wearable device may display an image representing a virtual object in the second virtual space 142 in the second visual object 132.

According to an embodiment, the wearable device may generate and/or display a third visual object 133 that is a thumbnail object of the third virtual space 143. The wearable device may display the third visual object 133 including an image for a virtual object (e.g., screens C and D and/or a virtual object 542) provided from one or more applications associated with the third virtual space 143. For example, the wearable device may couple an image 541 representing the virtual object 542 in the third visual object 133. With respect to the third virtual space 143 formed to display an AR-based screen, the wearable device may not display any closed-curved surface in the third visual object 133. Referring to FIG. 5, the third visual object 133 is illustrated, which is generated independently of the closed-curved surfaces 511 and 512 and includes an image representing a reference surface 523 of the third virtual space 143 and a virtual object in the third virtual space 143. In order to represent a location of the virtual object with respect to the reference surface 523, the wearable device may display a curved surface 513 connecting the reference surface 523 and the virtual object in the third visual object 133.

Referring to FIG. 5, according to an embodiment, the wearable device may generate or display a visual object indicating a characteristic of a virtual space, using a closed-curved surface (e.g., the closed-curved surfaces 511, 512) having a transparency distinguished by whether an augmented reality or an virtual reality is provided through the virtual space. The wearable device may intensively transmit the characteristic of the virtual space to a user wearing the wearable device, by displaying the visual object in the display. The visual object may have a size that may be displayed parallelly to another visual object in the display.

Hereinafter, an example of an operation in which the wearable device according to an embodiment displays a list of virtual spaces managed by the wearable device will be described in greater detail with reference to FIGS. 6A and 6B.

Figure 6A:
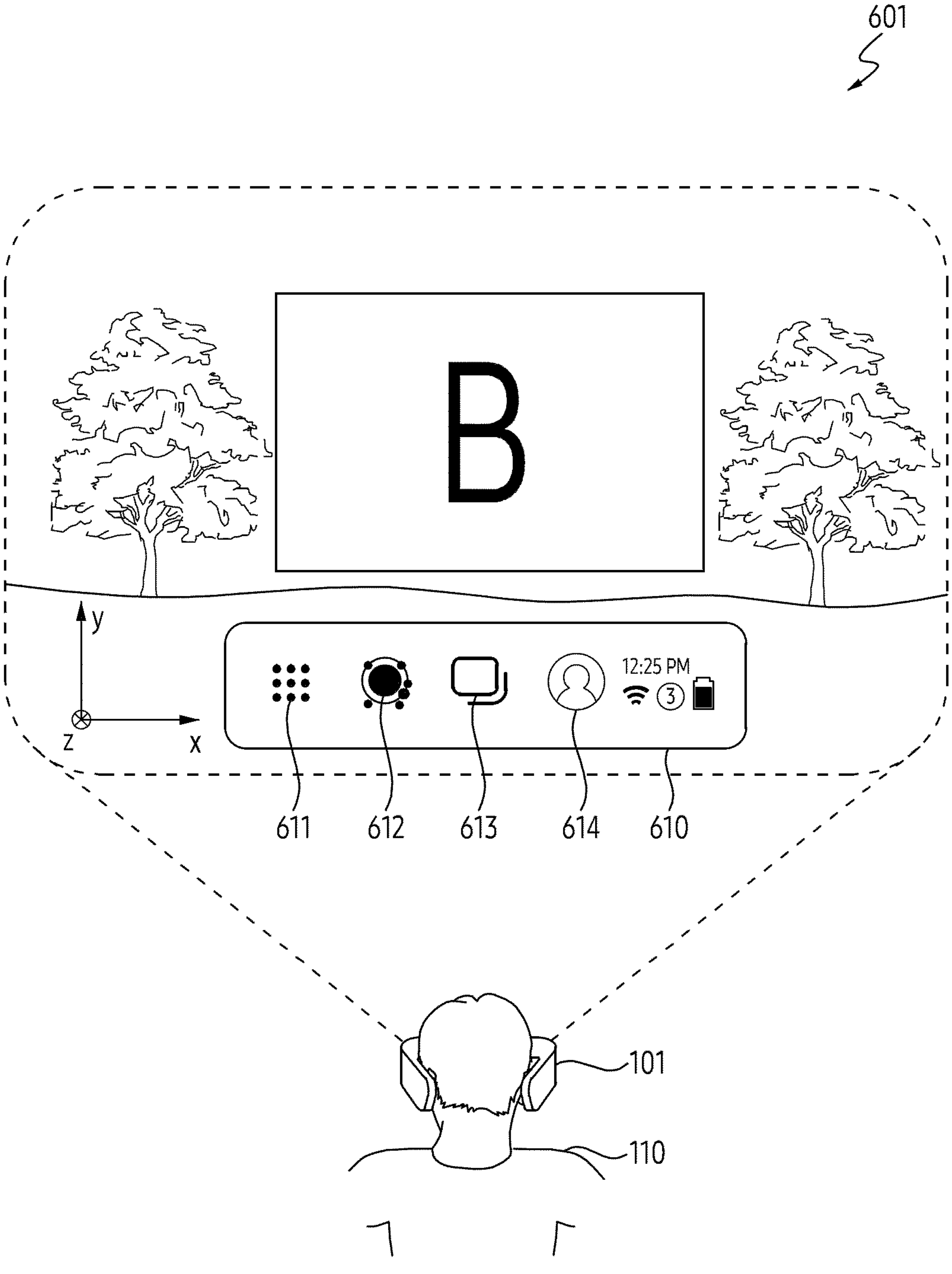
FIGS. 6A and 6B are diagrams illustrating an example operation in which a wearable device displays a screen including a list of virtual spaces according to various embodiments.
Figure 6B:
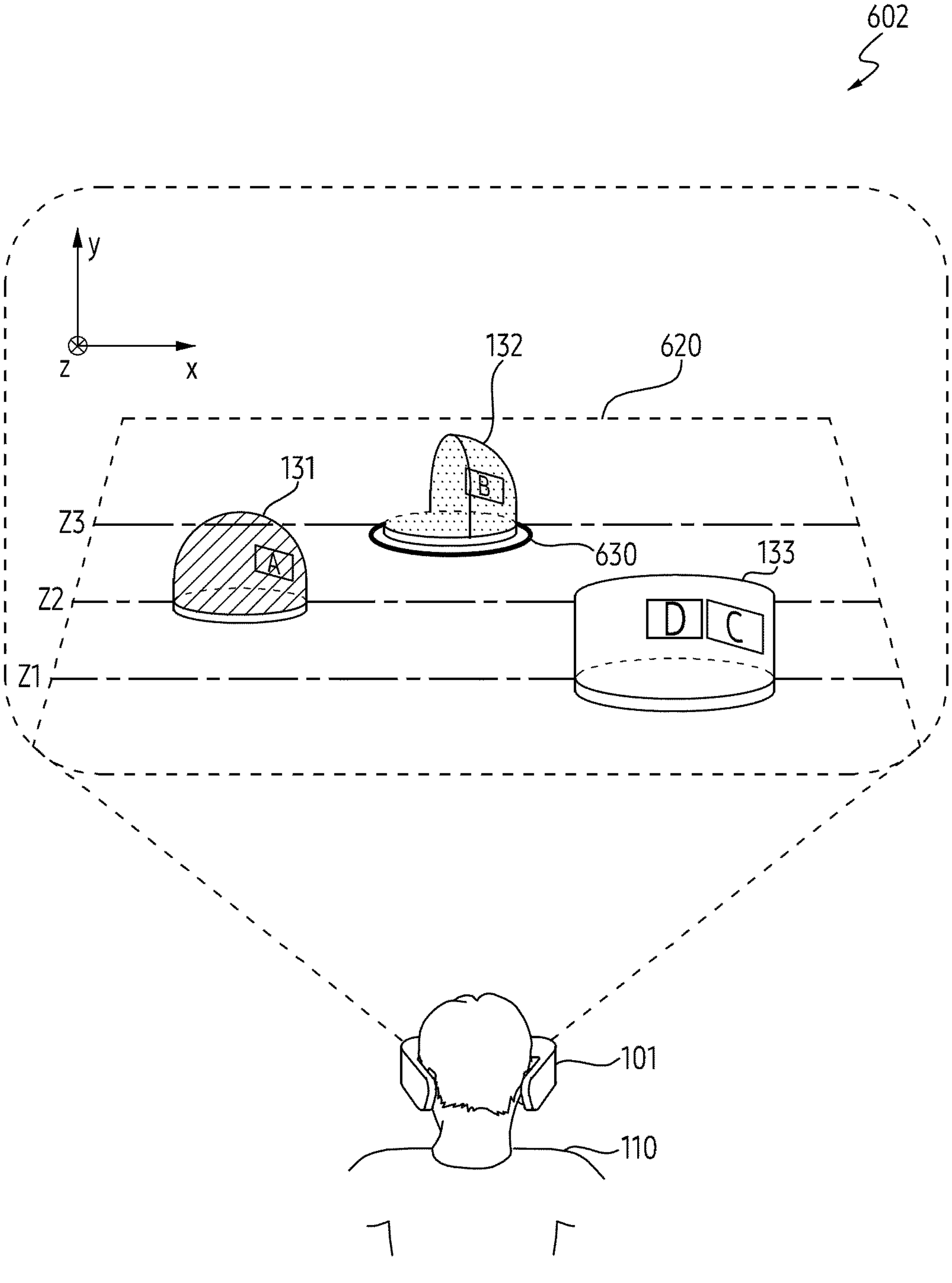

FIGS. 6A and 6B are diagrams illustrating an example operation in which a wearable device 101 displays a screen including a list of virtual spaces according to various embodiments. The wearable device 101 of FIGS. 1 and 2 may include the wearable device 101 of FIGS. 6A and 6B. Referring to FIGS. 6A and 6B, example states 601 and 602 displaying a UI based on at least one virtual space in a display area formed by a display (e.g., the display 220 of FIG. 2) of the wearable device 101 are illustrated.

In the state 601 of FIG. 6A, the wearable device 101 may display at least a portion of a specific virtual space (e.g., the second virtual space 142 of FIG. 1) in the display area. The wearable device 101 may cause one virtual object to be displayed at different locations in both eyes of a user 110 to provide a sense of distance based on a z-axis of the display area. A difference between the locations may be referred to as a binocular parallax. As the binocular parallax increases, the user 110 may recognize a virtual object as being positioned closer. For example, in the state 601 displaying a background object including a screen B and a tree included in a virtual space, the wearable device 101 may set a binocular parallax of the screen B to be larger than a binocular parallax of the background object. In the example, the user 110 may recognize that the background object is positioned farther than the screen B.

In the state 601 of FIG. 6A, the wearable device 101 may display a menu 610. The wearable device 101 may maintain the menu 610 in the display area independently of a motion of a head of the user 110, by displaying the menu 610 at a preset location of the display area. For example, in case that the wearable device 101 is rotated by the motion, the wearable device 101 may selectively move the screen B and the background object among the screen B and the background object (e.g., tree) positioned beyond the screen B, and the menu 610. The wearable device 101 may conditionally display the menu 610, based on a gaze of the user 110 wearing the wearable device 101. The wearable device 101 may display the menu 610 in response to a preset speech of the user 110 and/or a gesture of pressing a button formed on the wearable device 101.

Referring to FIG. 6A, the wearable device 101 may display one or more icons indicating a state of the wearable device 101 in the menu 610. For example, the wearable device 101 may display an icon indicating a SOC of a battery included in the wearable device 101 in the menu 610. The wearable device 101 may display an icon indicating a type (e.g., Wi-Fi, LTE, 5G and/or 6G) of a network to which the wearable device 101 is accessed in the menu 610. The wearable device 101 may display an icon and/or text indicating current time in the menu 610. The wearable device 101 may display an icon 614 to display account information of the user 110 logged into the wearable device 101 in the menu 610.

According to an embodiment, the wearable device 101 may display options to control the virtual space provided through the display area in the menu 610. The wearable device 101 may display an icon 611 to display a list of an application (e.g., one or more applications classified as the application layer 260 of FIG. 2) installed in the wearable device 101 in the menu 610. In response to detecting a gaze and/or a finger of the user 110 facing the icon 611 exceeding a preset period, the wearable device 101 may identify an input indicating selection of the icon 611. In response to the input, the wearable device 101 may display the list of the application corresponding to the icon 611. The wearable device 101 may display an icon 613 to display a list of one or more applications matched with the virtual space provided through the display area in the menu 610. The wearable device 101 may display an icon 612 to display a list of one or more virtual spaces generated by the wearable device 101 in the menu 610. According to an embodiment, the wearable device 101 may display the list of the one or more virtual spaces based on detecting a gesture (e.g., a gaze and/or a finger of the user 110 facing the icon 612) for selecting the icon 612. For example, the wearable device 101 may switch to the state 602 in which the list of the one or more virtual spaces is displayed.

In the state 602 of FIG. 6B, the wearable device 101 may display visual objects (e.g., the first visual object 131 to the third visual object 133) for virtual spaces (e.g., the first virtual space 141 to the third virtual space 143 of FIG. 1). In case that the wearable device 101 is switched from the state 601 in which at least a portion of a second virtual space corresponding to the second visual object 132 is displayed to the state 602, the wearable device 101 may guide that the second virtual space is activated, using an indicator 630 associated with the second visual object 132. Activation of the second virtual space may refer, for example, to at least one application (e.g., an application providing the screen B) associated with the second virtual space being executed. Together with the indicator 630, the wearable device 101 may display the second visual object 132 with brightness different from another visual object, by coupling a light source with the second visual object 132. For example, the brightness of the second visual object 132 may be brighter than brightness of the first visual object 131 and/or the third visual object 133.

In an embodiment, the wearable device 101 may change a size of the first visual object 131 corresponding to a first virtual space, based on the number of applications (e.g., an application executed to position a screen A and/or a virtual object in the first virtual space). As described above with reference to Table 1, the wearable device 101 may set a size of a visual object corresponding to a specific virtual space to be proportional to the number of applications associated with the specific virtual space. Referring to FIG. 6B, a size of the third visual object 133 corresponding to a third virtual space associated with two applications (e.g., applications that provided each of screens C and D) may be larger than the size of the first visual object 131 corresponding to the first virtual space associated with less than two applications.

In the state 602 of FIG. 6B, the wearable device 101 may change a distance (e.g., a depth and/or a binocular parallax) of a visual object corresponding to a virtual space in the display based on a history (e.g., a frequency and/or the number) entering the virtual space. In the example state 602 of FIG. 6B, the wearable device 101 may display the first visual object 131 to the third visual object 133 based on different distances Z1, Z2, and Z3 on a reference surface 620 parallel to an x-z plane. In an embodiment, an order of distances that the first visual object 131 to the third visual object 133 are viewed through the display may be a descending order of the number of entries into the first virtual space to the third virtual space corresponding to the first visual object 131 to third visual object 133, respectively. Referring to FIG. 6B, the wearable device 101 may guide that the third virtual space corresponding to the third visual object 133 has been used more frequently or longer than another virtual space, by positioning the third visual object 133 at the closest distance Z1 from the user 110. The wearable device 101 may guide that the first virtual space corresponding to the first visual object 131 is used less frequently than the third virtual space by positioning the first visual object 131 at the distance Z2 farther than the distance Z1. The wearable device 101 may guide that the second virtual space corresponding to the second visual object 132 has been used the least or during the shortest period among all virtual spaces (e.g., the first space to the third virtual space), by positioning the second visual object 132 at the farthest distance Z3 among the distances Z1, Z2, and Z3. A binocular parallax corresponding to the distance Z3 may be smaller than binocular parallaxes of the distances Z1 and Z2.

In the example state 602 of FIG. 6B, the user 110 wearing the wearable device 101 may recognize s characteristic of the first virtual space to the third virtual space based on a size and/or a distance of the first visual object 131 to the third visual object 133. For example, based on the third visual object 133 having a relatively large size, the user 110 may recognize that the third virtual space corresponding to the third visual object 133 is associated with more applications than another virtual space. For example, based on the second visual object 132 displayed relatively far away, the user 110 may recognize that the second virtual space has been used less than another virtual space. Based on a transparency and/or a shape of a closed-curved surface of the first visual object 131, the user 110 may recognize that the user 110 will enter the first virtual space for VR by selection of the first visual object 131. Based on a transparency and/or a shape of a closed-curved surface of the second visual object 132, the wearable device 101 may guide the second virtual space to provide the user 110 with a user experience associated with a partial AR by selection of the second visual object 132. Using a shape of the third visual object 133, the wearable device 101 may visualize a characteristic of the third virtual space for the AR.

As described above, according to an embodiment, the wearable device 101 may visualize a characteristic of a virtual space, using a size and/or a distance of a visual object corresponding to the virtual space. For example, the size of the visual object may be proportional to the number of virtual objects included in the virtual space corresponding to the visual object and/or applications associated with the virtual space. For example, a binocular parallax of the visual object may be proportional to the number, a frequency, and/or a period of entries into the virtual space corresponding to the visual object. As the binocular parallax of the visual object increases, the user 110 who views the visual object may recognize the visual object as being positioned closer. The wearable device 101 may visualize a characteristic of the virtual space corresponding to the visual object, using the size and/or a sense of distance of the visual object in the display.

Hereinafter, an example operation in which the wearable device 101 identifies an input selecting any one of the first visual objects 131 to the third visual objects 133 corresponding to different virtual spaces will be described in greater detail.

Figure 7A:
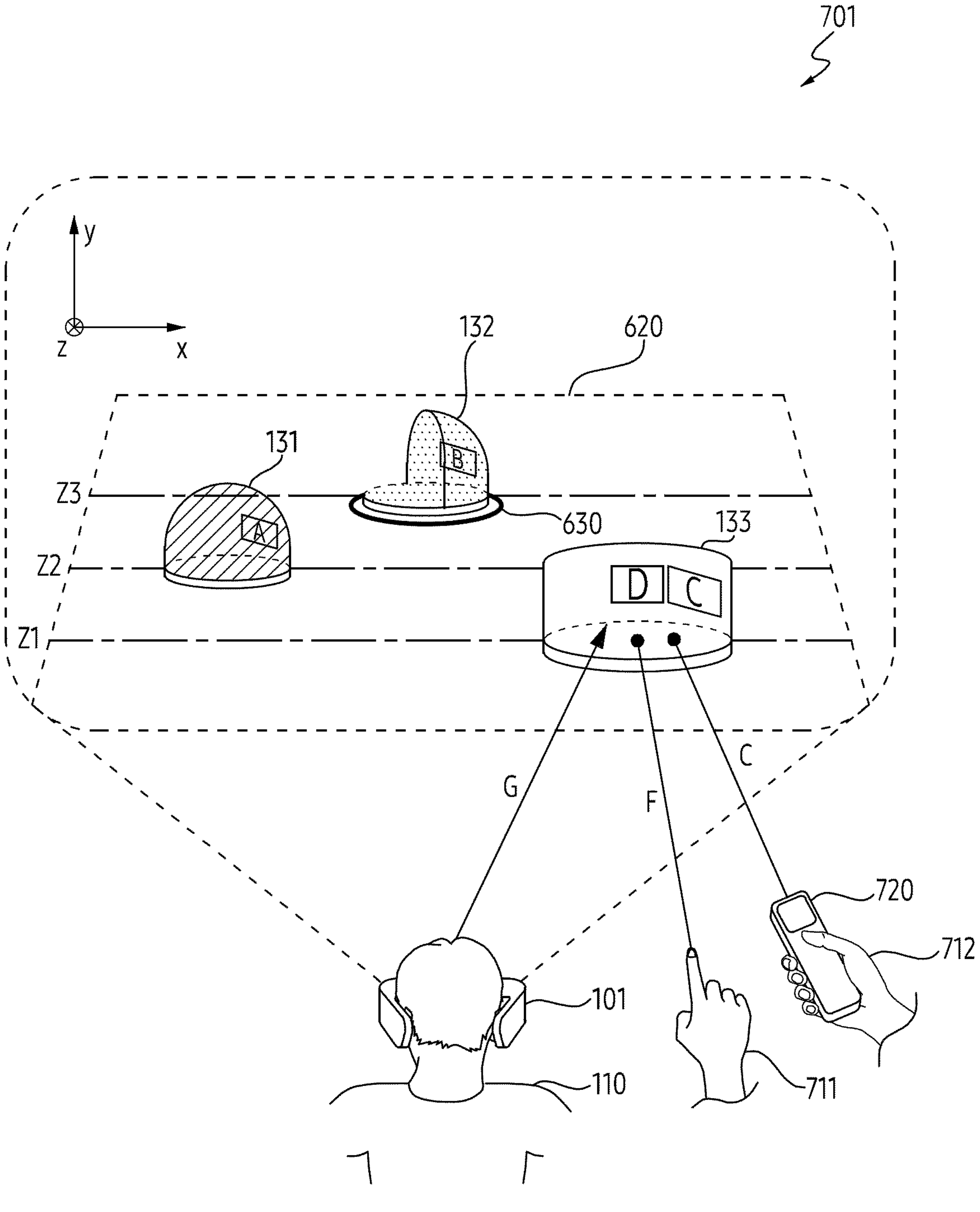
FIGS. 7A, 7B, and 7C are diagrams illustrating an example operation performed by a wearable device based on an input selecting a specific virtual space from a list of virtual spaces according to various embodiments.
Figure 7B:
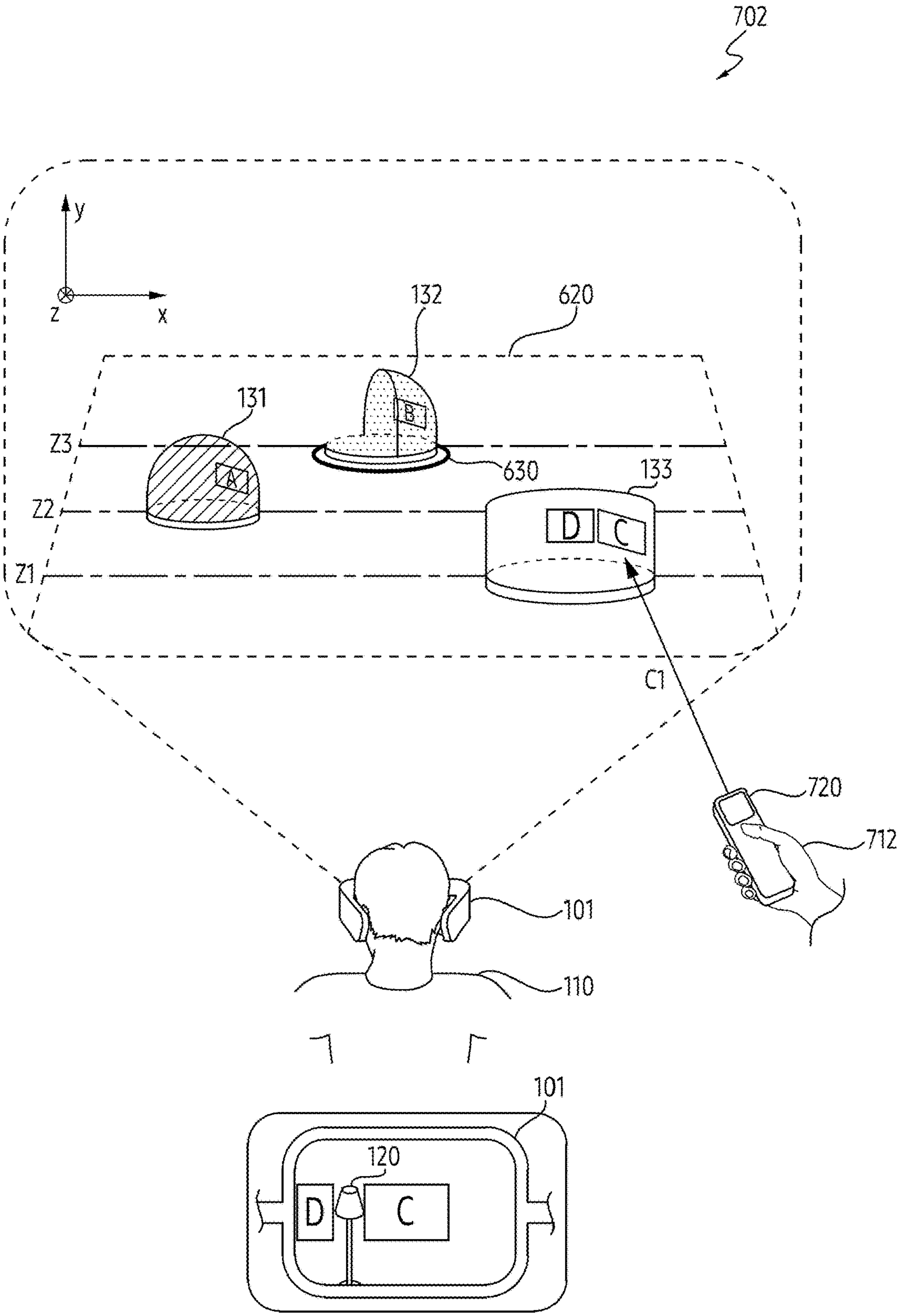
Figure 7C:
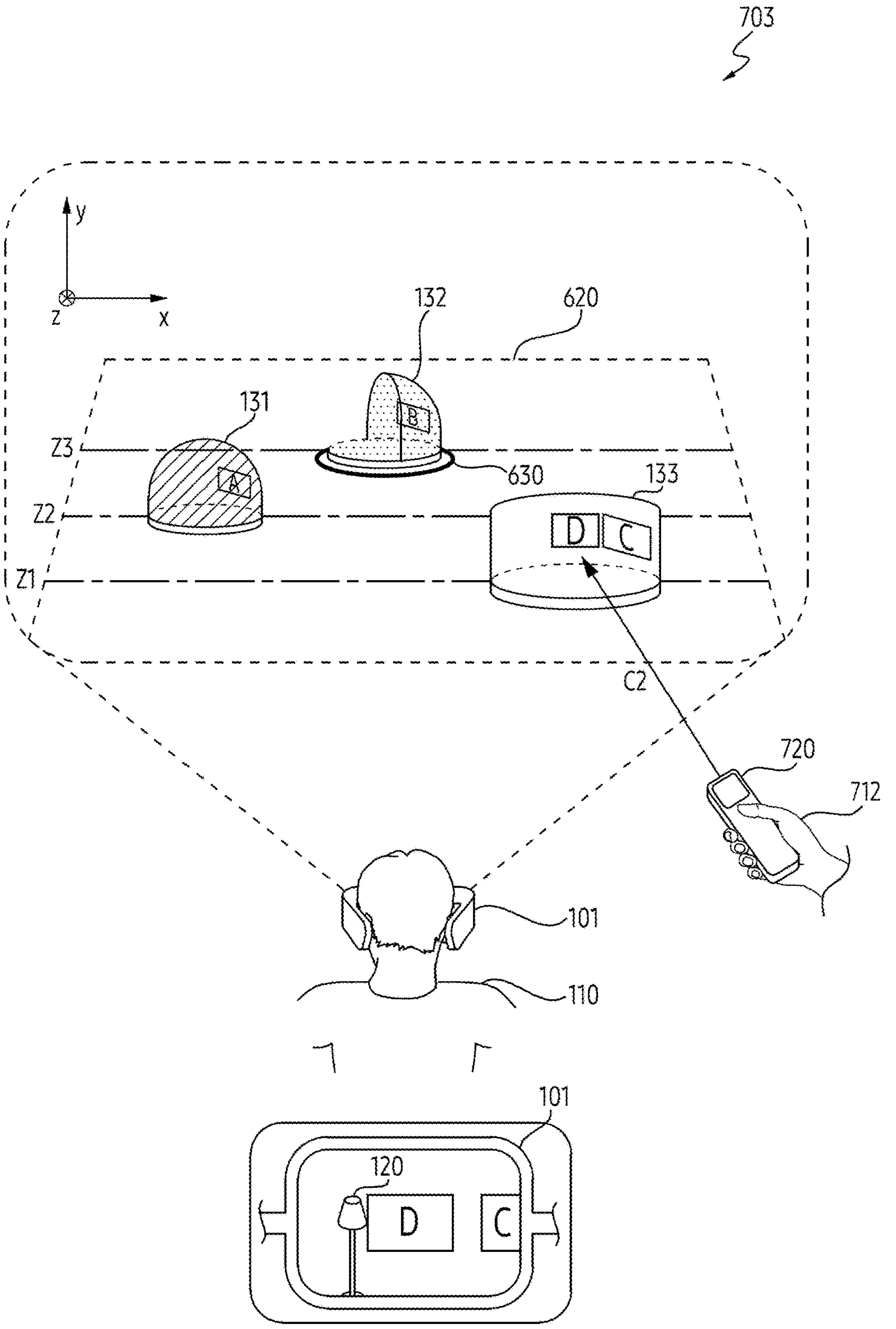

FIGS. 7A, 7B, and 7C are diagrams illustrating an example operation performed by a wearable device 101 based on an input selecting a specific virtual space from a list of virtual spaces according to various embodiments. The wearable device 101 of FIGS. 1 and 2 may include the wearable device 101 of FIGS. 7A, 7B, and 7C. An operation of the wearable device 101 described with reference to FIGS. 7A, 7B, and 7C may be performed by the wearable device 101 and/or the processor 210 of FIG. 2.

Referring to FIG. 7A, various inputs identified by the wearable device 101 are illustrated. A state 701 of FIG. 7A may correspond to the state 602 of FIG. 6B. According to an embodiment, the wearable device 101 may obtain information indicating a direction G of a gaze of a user 110, using a camera (e.g., the camera 225 of FIG. 2 and/or the ET CAM 340-1 of FIG. 3B). The information may include an image and/or a video including eyes of the user 110. The wearable device 101 may obtain information indicating a direction F of a fingertip of a hand 711, using a camera (e.g., the camera 225 of FIG. 2 and/or the motion recognition camera 340-2 of FIG. 3B). The information may include an image and/or a video including the hand 711. In case of communicating with an external electronic device such as a remote controller 720 (e.g., pairing), the wearable device 101 may identify a direction C in which the remote controller 720 faces, based on information received from the remote controller 720. The information received from the remote controller 720 may include data on a motion of the remote controller 720 identified by an IMU included in the remote controller 720. The motion of the remote controller 720 may be generated by a hand 712 holding the remote controller 720.

Referring to FIG. 7A, according to an embodiment, the wearable device 101 may identify an input selecting any one of visual objects (e.g., a first visual object 131 to a third visual object 133) displayed by a display, based on at least one of directions G, F, and C. For example, the wearable device 101 may identify the input, based on the direction G of a gaze and/or the direction F of a fingertip that is fixed exceeding a preset period. For example, the wearable device 101 may identify the input, based on the direction C of the remote controller 720 at a time point when a preset button of the remote controller 720 is pressed. In response to the input, the wearable device 101 may display at least a portion of a virtual space corresponding to a visual object selected by the input. Referring to FIGS. 7B and 7C, example states 702 and 703 identifying an input selecting the third visual object 133 based on the remote controller 720 are illustrated. In case that the input is identified through the remote controller 720, the wearable device 101 may cause the remote controller 720 to output haptic feedback (e.g., a vibration signal) for the input, by controlling the remote controller 720.

According to an embodiment, the wearable device 101 may display different virtual objects included in a virtual space in a visual object. The wearable device 101 may couple images representing the virtual objects in the visual object, based on a locational relationship of the virtual objects in the virtual space. For example, a locational relationship of the images coupled with the visual object and a positional relationship of the virtual objects may coincide with each other. The wearable device 101 may identify a point in a visual object specified by an input based on the input selecting the visual object. The wearable device 101 may display a screen including the virtual object mapped to the point in the display.

Referring to FIG. 7B, it is assumed that the wearable device 101 identifies a direction C1 of the remote controller 720 facing an image representing a screen C in the third visual object 133. In the state 702 of FIG. 7B, the wearable device 101 identifying the direction C1 may display the screen C included in a third virtual space corresponding to the third visual object 133 at a center of the display. In the state 702 displaying a portion of the third virtual space to provide a VST and/or an AR, the wearable device 101 may cause an external object 120 to be visible together with the screen C. In the state 702, the wearable device 101 may cause the screen C to be displayed at the center of the display and/or a display area, by forming a view angle centered on the screen C in the third virtual space.

In the state 703 of FIG. 7C, the remote controller 720 may face a screen D in the third virtual space represented through the third visual object 133 by the hand 712. In the state 703, based on identifying a direction C2 of the remote controller 720 facing the screen D in the third virtual space represented through the third visual object 133, the wearable device 101 may display a portion of the third virtual space including the screen D in the display. For example, the wearable device 101 may display a portion of the third virtual space including the screen D in the display, using a view angle (e.g., a view angle facing the screen D) corresponding to the direction C2.

According to an embodiment, the wearable device 101 may activate a camera (e.g., the camera 225 of FIG. 2) of the wearable device 101, based on a characteristic of the virtual space selected by at least one of the directions G, F, and C. For example, in case that the first visual object 131 corresponding to a first virtual space to provide a virtual reality is selected, the wearable device 101 may deactivate the camera. For example, in case that the third visual object 133 corresponding to the third virtual space to provide the augmented reality (or the VST) is selected, the wearable device 101 may obtain an image and/or a video of an external space, by activating the camera. The wearable device 101 may recognize the external space in a state of entering the third virtual space, using the obtained image and/or video. For example, the wearable device 101 recognizing the external space using the external space recognizer 274 of FIG. 2 may be selectively performed by an input selecting a virtual space (e.g., a second virtual space or the third virtual space corresponding to a second visual object 132 to the third visual object 133) for the AR, the VST, and/or a partial AR. By selectively recognizing the external space, the wearable device 101 may reduce an amount of calculation performed for recognition of the external space.

As described above, in the state 701 in which visual objects corresponding to virtual spaces are aligned, according to an embodiment, in response to an input selecting a specific visual object, the wearable device 101 may display a portion of a specific virtual space. The wearable device 101 may adjust a view angle of a virtual space based on a portion of the visual object specified by the input. The wearable device 101 may determine whether to activate the camera based on a characteristic of the virtual space selected by the input.

Hereinafter, an example operation performed by the wearable device 101 according to an embodiment will be described in greater detail with reference to FIG. 8, based on a list of virtual spaces.

Figure 8:
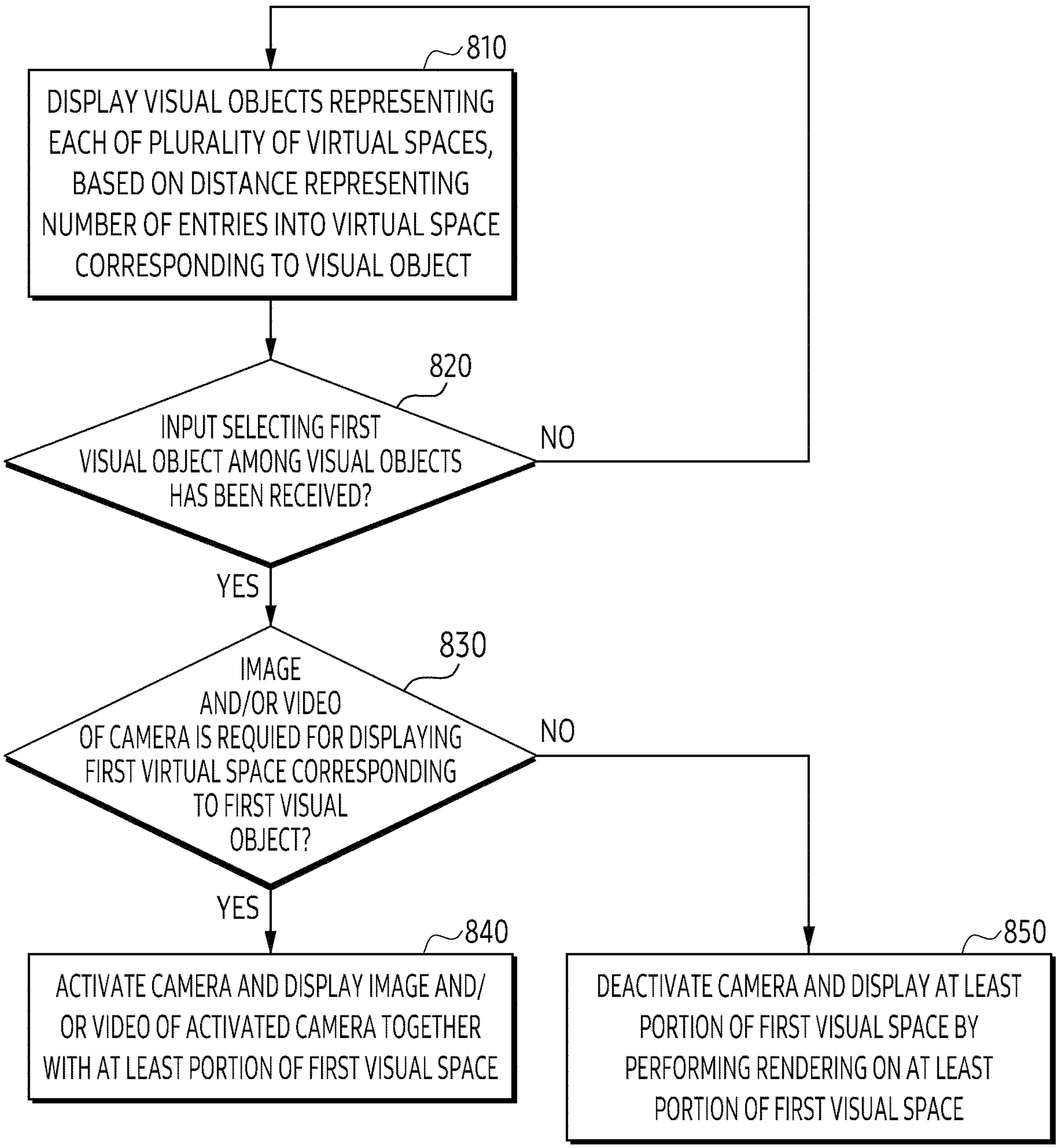
FIG. 8 is a flowchart illustrating an example method of operating a wearable device according to various embodiments.

FIG. 8 is a flowchart illustrating an example operation of a wearable device according to various embodiments. The wearable device 101 of FIGS. 1 and 2 may include the wearable device of FIG. 8. An operation of the wearable device 101 described with reference to FIG. 8 may be performed by the wearable device 101 and/or the processor 210 of FIG. 2.

Referring to FIG. 8, in operation 810, according to an embodiment, the wearable device may display visual objects representing each of a plurality of virtual spaces, based on a distance indicating the number of entries into a virtual space corresponding to a visual object. For example, the wearable device may switch to the state 602 of FIG. 6B and/or the state 701 of FIG. 7A, by performing operation 810. The wearable device may provide a sense of distance to the visual object, using a binocular parallax corresponding to a distance.

Referring to FIG. 8, in operation 820, according to an embodiment, the wearable device may identify whether an input selecting a first visual object among the visual objects has been received. The input of operation 820 may be identified based on at least one of directions G, F, and C of FIG. 7A. For example, the wearable device may identify the input selecting the first visual object, based on a direction of a gaze and/or a hand (e.g., the hand 711 of FIG. 7A) of a user (e.g., the user 110 of FIG. 1) wearing the wearable device and/or a direction of an external electronic device (e.g., the remote controller 720 of FIG. 7A) connected to the wearable device. Before receiving the input of operation 820 (820—NO), the wearable device may maintain displaying the visual objects based on the operation 810.

In a state of receiving the input selecting the first visual object (820—YES), according to an embodiment, the wearable device may identify whether an image and/or a video of a camera (e.g., the camera 225 of FIG. 2) is required for displaying a first virtual space corresponding to the first visual object, by performing operation 830. For example, the wearable device may determine whether to activate the camera, based on a characteristic of the first virtual space corresponding to the first visual object. In case that the first virtual space corresponding to the first visual object is formed to provide a virtual reality completely isolated from an external space, the wearable device may identify that the image and/or the video of the camera is not required for displaying the first virtual space. In case that the first virtual space is formed to provide an augmented reality (or a mixed reality, an extended reality and/or a VST) mixed with the external space, the wearable device may identify that the image and/or the video of the camera is required for displaying the first virtual space.

In a state in which the image and/or the video of the camera is required for displaying the first virtual space (830—YES), the wearable device may activate the camera and display the image and/the video of the activated camera together with at least a portion of the first virtual space, by performing operation 840. For example, the wearable device may perform operation 840 in a state of identifying the first virtual space to provide a user experience based on the AR, the MR, and/or the VST. Based on operation 840, the wearable device may display a UI in which the external space represented by the image and/or the video and the first virtual space are coupled. For example, the states 192 and 193 of FIG. 1, the state 601 of FIG. 6A, and/or the states 702 and 703 of FIGS. 7B and 7C may be an example state in which the wearable device has performed operation 840.

In a state in which the image and/or the video of the camera is not required for displaying the first virtual space (830—NO), the wearable device may deactivate the camera by performing operation 850 and display at least a portion of the first virtual space by performing rendering on at least a portion of the first virtual space. For example, the wearable device may perform operation 850 in a state of identifying the first virtual space to provide a user experience based on the VR. Based on operation 850, the wearable device may display an image and/or a video covering the external space in a display (e.g., the display 220 of FIG. 2). For example, the state 191 of FIG. 1 may be an example state in which the wearable device has performed operation 850.

As described above, according to an embodiment, the wearable device may manage at least one application executed by the wearable device, using a plurality of virtual spaces. The wearable device may align visual objects representing the plurality of virtual spaces along a distance in the display. For example, a distance (or a binocular parallax) at which the visual object is displayed in the display may indicate a history of interaction between the virtual space corresponding to the visual object and the user (e.g., the user 110 of FIG. 1) of the wearable device. The wearable device may provide the user with a characteristic and/or a preview of the virtual space corresponding to the visual object based on a shape and/or a size of the visual object.

The operation of the wearable device described above with reference to FIGS. 1 to 8 may be associated with a metaverse service provided through a network. Hereinafter, an example of the metaverse service provided to the user based on the wearable device 101 according to an embodiment will be described in greater detail with reference to FIG. 9.

Metaverse is a compound word of the English words "Meta" referring to "virtual" and "transcendence" and "Universe" referring to cosmos, and refers to a three-dimensional virtual world in which social, economic, and cultural activities take place like a real world. Metaverse is a concept that has evolved one step further than a virtual reality (VR, cutting-edge technology that enables people to experience real-life experiences in a virtual world created by a computer), and it is characterized using avatars to not only enjoy games or virtual reality, but also social and cultural activities like a reality. A metaverse service may provide media content for enhancing immersion in the virtual world, based on an augmented reality (AR), a virtual reality environment (VR), a mixed environment (MR), and/or an extended reality (XR).

For example, media content provided by the metaverse service may include social interaction content including avatar-based game, concert, party, and/or meeting. For example, the media content may include information for economic activities such as advertising, user created content, and/or sales and/or shopping of productions. Ownership of the user created content may be proved by a blockchain-based non-fungible token (NFT). The metaverse service may support economic activities based on real money and/or cryptocurrency. By the metaverse service, virtual content associated with the real world, such as digital twin or life logging, may be provided.

Figure 9:
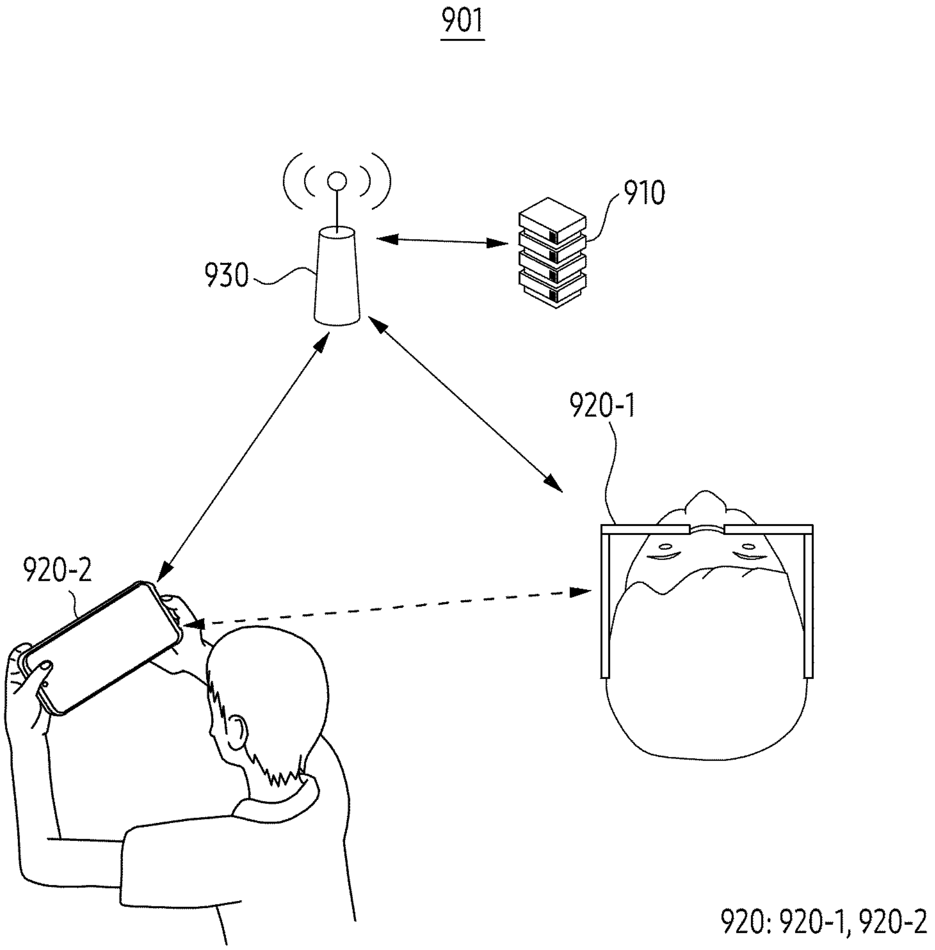
FIG. 9 is a diagram illustrating an example of a network environment associated with a metaverse service according to various embodiments.

FIG. 9 is a diagram illustrating an example network environment 901 in which a metaverse service is provided through a server 910 according to various embodiments.

Referring to FIG. 9, a network environment 901 may include a server 910, a user terminal 920 (e.g., a first terminal 920-1 and a second terminal 920-2), and a network connecting the server 910 and the user terminal 920. In the network environment 901, the server 910 may provide a metaverse service to the user terminal 920. The network may be formed by at least one intermediate node 930 including an access point (AP) and/or a base station. The user terminal 920 may access the server 920 through the network and output a user interface (UI) associated with a metaverse service to a user of the user terminal 920. Based on the UI, the user terminal 920 may obtain information to be input into the metaverse service from the user, or output information (e.g., multimedia content) associated with the metaverse service to the user.

In this case, the server 910 provides a virtual space so that the user terminal 920 may perform activities in the virtual space. In addition, the user terminal 920 may represent information provided by the server 910 to the user by installing an S/W agent to access the virtual space provided by the server 910, or transmit information that the user wants to represent in the virtual space to the server. The S/W agent may be provided directly through the server 910, downloaded from a public server, or embedded and provided when purchasing a terminal.

In an embodiment, the metaverse service may provide a service to the user terminal 920 and/or a user using the server 910. The disclosure is not limited thereto, and the metaverse service may be provided through individual contacts between users. For example, in the network environment 901, the metaverse service may be provided by a direct connection between the first terminal 920-1 and the second terminal 920-2, independently of the server 910. Referring to FIG. 9, in the network environment 901, the first terminal 920-1 and the second terminal 920-2 may be connected to each other through a network formed by at least one intermediate node 930. In an embodiment in which the first terminal 920-1 and the second terminal 920-2 are directly connected, any one of the first terminal 920-1 and the second terminal 920-2 may perform a role of the server 910. For example, a metaverse environment may be configured only with a device-to-device connection (e.g., a peer-to-peer (P2P) connection).

In an embodiment, the user terminal 920 (or the user terminal 920 including the first terminal 920-1 and the second terminal 920-2) may be made in various form factors, and it is characterized by including an output device for providing an image and/or sound to the user and an input device for inputting information into the metaverse service. An example user terminal 920 in various form factors may include a smartphone (e.g., the second terminal 920-2), an AR device (e.g., the first terminal 920-1), a VR device, an MR device, a Video See Through (VST) device, an Optical See Through (OST) device, a smart lens, a smart mirror, a TV capable of inputting and outputting, or a projector.

A network (e.g., a network formed by at least one intermediate node 930) includes all of various broadband networks including 3G, 4G, and 5G and short-range networks (e.g., a wired network or a wireless network that directly connects the first terminal 920-1 and the second terminal 920-2) including Wi-Fi and BT. In an embodiment, the user terminal 920 of FIG. 9 may include the wearable device 101 of FIGS. 1 to 8.

In an example embodiment, a method visualizing a characteristic of virtual spaces, using a list of the virtual spaces provided by a wearable device may be required. As described above, according to an example embodiment, a wearable device (e.g., the wearable device 101 of FIGS. 1 to 7) may comprise a sensor (e.g., the sensor 230 of FIG. 2), a display (e.g., the display 220 of FIG. 2), memory (e.g., the memory 215 of FIG. 2) storing instructions, and/or at least one processor (e.g., the processor 210 of FIG. 2), comprising processing circuitry. At least one processor, individually and/or collectively, may be configured to execute the instructions and to cause the wearable device to" display, using a size based on a number of applications associated with a first virtual space (e.g., the virtual space 141 of FIG. 1) and a first distance associated with a number of entries into the first virtual space, a first visual object (e.g., the first visual object 131 of FIGS. 1, 5, 6A to 6B, 7A, 7B, and 7C) corresponding to the first virtual space, in the display; using a second size based on a number of applications associated with a second virtual space (e.g., the second virtual space 142 of FIG. 1) and a second distance associated with a number of entries into the second virtual space, a second visual object (e.g., the second visual object 132 of FIGS. 1, 5, 6A to 6B, 7A, 7B, and 7C) corresponding to the second virtual space, in the display; and display, in response to an input selecting one of the first visual object or the second visual object, at least a portion of a virtual space corresponding to a visual object selected by the input, in the display. According to an example embodiment, the wearable device may display visual objects representing a characteristic of virtual spaces.

For example, at least one processor, individually and/or collectively, may be configured to cause the wearable device to display the first visual object including a closed-curved surface (e.g., the closed-curved surface 511 of FIG. 5) where an image with respect to a window or a widget provided from an application associated with the first virtual space is positioned.

For example, at least one processor, individually and/or collectively, may be configured to cause the wearable device to display the closed-curved surface based on at least one of a first transparency indicating providing an augmented reality using the first virtual space or a second transparency indicating providing a virtual reality using the first virtual space.

For example, at least one processor, individually and/or collectively, may be configured to cause the wearable device to display, in response to the input selecting an image with respect to a window at a portion of the first visual object distinguished by the closed-curved surface, a portion of the first virtual space based on a view angle facing the window in the first virtual space.

For example, at least one processor, individually and/or collectively, may be configured to cause the wearable device to in a state that a number of applications associated with the first virtual space is greater than a number of applications associated with the second virtual space, display the second visual object using the second size smaller than the first size.

For example, at least one processor, individually and/or collectively, may be configured to cause the wearable device to, in a state that a number of entries into the first virtual space is greater than a number of entries into the second virtual space, display the second visual object using the second distance longer than the first distance.

For example, at least one processor, individually and/or collectively, may be configured to cause the wearable device to display the second visual object at the second distance, based on a binocular parallax smaller than a binocular parallax of the first visual object.

For example, at least one processor, individually and/or collectively, may be configured to cause the wearable device to in response to another input to display a list of a virtual space in a state displaying at least a portion of the virtual space, display a screen that the first visual object and the second visual object are arranged by the first distance and the second distance.

For example, the wearable device may further comprise a camera (e.g., the camera 225 of FIG. 2). At least one processor, individually and/or collectively, may be configured to cause the wearable device to: in response to the input selecting the first visual object corresponding to the first virtual space to provide an augmented reality, activate the camera; and display at least one virtual object provided from the application associated with the first virtual space together with at least one image obtained from the activated camera, in the display.

For example, at least one processor, individually and/or collectively, may be configured to cause the wearable device to in response to another input selecting the second virtual space to provide virtual reality different from the augmented reality based on the second visual object, deactivate the camera.

As described above, according to an example embodiments, a method of operating a wearable device may comprise: displaying, using a first size based on a number of applications associated with a first virtual space and a first distance associated with a number of entries into the first virtual space, a first visual object corresponding to the first virtual space, in a display of the wearable device; using a second size based on a number of applications associated with a second virtual space and a second distance associated with a number of entries into the second virtual space, a second visual object corresponding to the second virtual space, in the display; and in response to an input selecting one of the first visual object or the second visual object, at least a portion of a virtual space corresponding to a visual object selected by the input, in the display.

For example, the displaying the first visual object may comprise displaying the first visual object including a closed-curved surface where an image with respect to a window or a widget provided from an application associated with the first virtual space is positioned.

For example, the displaying the first visual object may comprise displaying the closed-curved surface based on at least one of a first transparency indicating providing an augmented reality using the first virtual space or a second transparency indicating providing a virtual reality using the first virtual space.

For example, the displaying the first visual object may comprise displaying, in response to the input selecting an image with respect to a window at a portion of the first visual object distinguished by the closed-curved surface, a portion of the first virtual space based on a view angle facing the window in the first virtual space.

For example, the displaying the second visual object may comprise, in a state that a number of applications associated with the first virtual space is greater than a number of applications associated with the second virtual space, displaying the second visual object using the second size smaller than the first size.

For example, the displaying the second visual object may comprise, in a state that a number of entries into the first virtual space is greater than a number of entries into the second virtual space, displaying the second visual object using the second distance longer than the first distance.

For example, the displaying the second visual object may comprise displaying the second visual object at the second distance, based on a binocular parallax smaller than a binocular parallax of the first visual object.

For example, the displaying at least a portion of the virtual space may comprise, in response to another input to display a list of a virtual space in a state displaying at least a portion of the virtual space, displaying a screen that the first visual object and the second visual object are arranged by the first distance and the second distance.

For example, the displaying at least a portion of the virtual space may comprise, in response to the input selecting the first visual object corresponding to the first virtual space to provide an augmented reality, activating the camera of the wearable device. The method may comprise displaying at least one virtual object provided from the application associated with the first virtual space together with at least one image obtained from the activated camera, in the display.

As described above, according to an example embodiment, a method of operating a wearable device may comprise: displaying a first virtual object provided from a first application associated with a first virtual space in a display of the wearable device; in response to an input to display a list of a plurality of virtual spaces in a state displaying the first virtual object, identifying a second virtual space distinguished from the first virtual space; based on identifying the second virtual space, displaying a first visual object representing the first virtual space based on an image representing the first virtual object using the first distance and a second visual object representing the second virtual space using a second distance distinguished from the first distance; and in response to an input selecting one of the first visual object or the second visual object, displaying at least a portion of a virtual space corresponding to a visual object selected by the input, in the display.

As described above, according to an example embodiment, a wearable device may comprise a display, memory storing instructions, and at least one processor comprising processing circuitry, wherein at least one processor, individually and/or collectively, may be configured to execute the instructions and to cause the wearable device to: display the first virtual object provided from the first application associated with the first virtual space in the display; in response to an input to display the list of the plurality of virtual spaces in the state displaying the first virtual object, identify the second virtual space distinguished from the first virtual space; display, based on identifying the second virtual space, the first visual object representing the first virtual space based on an image representing the first virtual object using the first distance and the second visual object representing the second virtual space using the second distance distinguished from the first distance; and display, in response to an input selecting one of the first visual object or the second visual object, at least a portion of the virtual space corresponding to the visual object selected by the input, in the display.

As described above, in an example embodiment, a non-transitory computer-readable storage medium storing instructions may be provided. The instructions, when executed by at least one processor, comprising processing circuitry, individually and/or collectively, of a wearable device including a display, may cause the wearable device to: display, using a first size based on a number of applications associated with a first virtual space and a first distance associated with a number of entries into the first virtual space, a first visual object corresponding to the first virtual space, in the display; using a second size based on a number of applications associated with a second virtual space and a second distance associated with a number of entries into the second virtual space, a second visual object corresponding to the second virtual space, in the display; and in response to an input selecting any one of the first visual object or the second visual object, at least a portion of a virtual space corresponding to a visual object selected by the input, in the display.

The device described above may be implemented as a hardware component, a software component, and/or a combination of a hardware component and a software component. For example, the devices and components described in the various embodiments may be implemented using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but one skilled in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to the various embodiments may be implemented in the form of a program command that may be performed through various computer means and recorded on a computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include a magnetic medium such as a hard disk, floppy disk, and magnetic tape, optical recording medium such as a CD-ROM and DVD, magneto-optical medium, such as a floptical disk, and those configured to store program instructions, including ROM, RAM, flash memory, and the like. In addition, examples of other media may include recording media or storage media managed by app stores that distribute applications, sites that supply or distribute various software, servers, and the like.

As described above, although the various embodiments have been described with limited examples and drawings, one skilled in the relevant technical field is capable of various modifications and transform from the above description. For example, even if the described technologies are performed in a different order from the described method, and/or the components of the described system, structure, device, circuit, and the like are coupled or combined in a different form from the described method, or replaced or substituted by other components or equivalents, appropriate a result may be achieved.

Therefore, other implementations, other embodiments, and those equivalent to the scope of the claims fall within the scope of the disclosure. It will also be understood than any of the embodiment(s) described herein may be used in conjunction with any other embodiment(s) described herein.

No claim element is to be construed under the provisions of 35 U.S.C. § 112, sixth paragraph, unless the element is expressly recited using the phrase “means for” or “means.”

What is claimed is:

1. A wearable device, comprising:
a sensor;
a display;
memory comprising one or more storage media storing instructions, and
at least one processor comprising processing circuitry, wherein instructions, when executed by at least one processor individually and/or collectively, cause the wearable device to:
display, using a first size based on a number of applications associated with a first virtual space and a first distance associated with a number of entries into the first virtual space, a first visual object corresponding to the first virtual space, in the display;
display, using a second size based on a number of applications associated with a second virtual space and a second distance associated with a number of entries into the second virtual space, a second visual object corresponding to the second virtual space, in the display; and
display, in response to an input selecting one of the first visual object or the second visual object, at least a portion of a virtual space corresponding to a visual object selected by the input, in the display.

2. The wearable device of claim 1, wherein the instructions, when executed by at least one processor individually or collectively, cause the wearable device to:
display the first visual object including a closed-curved surface where an image with respect to a window or a widget provided from an application associated with the first virtual space is positioned.

3. The wearable device of claim 2, wherein the instructions, when executed by at least one processor individually or collectively, cause the wearable device to:
display the closed-curved surface based on at least one of a first transparency indicating providing an augmented reality using the first virtual space or a second transparency indicating providing a virtual reality using the first virtual space.

4. The wearable device of claim 2, wherein the instructions, when executed by at least one processor individually or collectively, cause the wearable device to:
display, in response to the input selecting an image with respect to a window at a portion of the first visual object distinguished by the closed-curved surface, a portion of the first virtual space based on a view angle facing the window in the first virtual space.

5. The wearable device of claim 1, wherein the instructions, when executed by at least one processor individually or collectively, cause the wearable device to:
in a state that a number of applications associated with the first virtual space is greater than a number of applications associated with the second virtual space, display the second visual object using the second size smaller than the first size.

6. The wearable device of claim 1, wherein the instructions, when executed by at least one processor individually or collectively, cause the wearable device to:
in a state that a number of entries into the first virtual space is greater than a number of entries into the second virtual space, display the second visual object using the second distance longer than the first distance.

7. The wearable device of claim 6, wherein the instructions, when executed by at least one processor individually or collectively, cause the wearable device to:
display the second visual object at the second distance, based on a binocular parallax smaller than a binocular parallax of the first visual object.

8. The wearable device of claim 1, wherein the instructions, when executed by at least one processor individually or collectively, cause the wearable device to:
in response to another input to display a list of a virtual space in a state displaying at least a portion of the virtual space, display a screen in which the first visual object and the second visual object are arranged by the first distance and the second distance.

9. The wearable device of claim 1, further comprising a camera,
wherein the instructions, when executed by at least one processor individually or collectively, cause the wearable device to:
in response to the input selecting the first visual object corresponding to the first virtual space to provide an augmented reality, activate the camera;
display at least one virtual object provided from the application associated with the first virtual space together with at least one image obtained from the activated camera, in the display.

10. The wearable device of claim 9, wherein the instructions, when executed by at least one processor individually or collectively, cause the wearable device to:
in response to another input selecting the second virtual space to provide a virtual reality different from the augmented reality based on the second visual object, deactivate the camera.

11. A method of operating a wearable device, comprising:
displaying, using a first size based on a number of applications associated with a first virtual space and a first distance associated with a number of entries into the first virtual space, a first visual object corresponding to the first virtual space, in a display of the wearable device;

displaying, using a second size based on a number of applications associated with a second virtual space and a second distance associated with a number of entries into the second virtual space, a second visual object corresponding to the second virtual space, in the display; and displaying, in response to an input selecting one of the first visual object or the second visual object, at least a portion of a virtual space corresponding to a visual object selected by the input, in the display.

12. The method of claim 11, wherein the displaying the first visual object comprises:

displaying the first visual object including a closed-curved surface where an image with respect to a window or a widget provided from an application associated with the first virtual space is positioned.

13. The method of claim 12, wherein the displaying the first visual object comprises:

displaying the closed-curved surface based on at least one of a first transparency indicating providing an augmented reality using the first virtual space or a second transparency indicating providing a virtual reality using the first virtual space.

14. The method of claim 12, wherein the displaying the first visual object comprises:

displaying, in response to the input selecting an image with respect to a window at a portion of the first visual object distinguished by the closed-curved surface, a portion of the first virtual space based on a view angle facing the window in the first virtual space.

15. The method of claim 11, wherein the displaying the second visual object comprises:

in a state that a number of applications associated with the first virtual space is greater than a number of applications associated with the second virtual space, displaying the second visual object using the second size smaller than the first size.

16. The method of claim 11, wherein the displaying the second visual object comprises:

in a state that a number of entries into the first virtual space is greater than a number of entries into the second virtual space, displaying the second visual object using the second distance longer than the first distance.

17. The method of claim 11, wherein the displaying the second visual object comprises:

displaying the second visual object at the second distance, based on a binocular parallax smaller than a binocular parallax of the first visual object.

18. The method of claim 11, wherein the displaying the at least portion of the virtual space comprises:

in response to another input to display a list of a virtual space in a state displaying at least a portion of the virtual space, displaying a screen in which the first visual object and the second visual object are arranged by the first distance and the second distance.

19. The method of claim 11, wherein the displaying the at least portion of the virtual space comprises:

in response to the input selecting the first visual object corresponding to the first virtual space to provide an augmented reality, activate a camera of the wearable device;

display at least one virtual object provided from the application associated with the first virtual space together with at least one image obtained from the activated camera, in the display.

20. A non-transitory computer-readable storage medium storing instructions, wherein the instructions, when executed by at least one processor, comprising processing circuitry, individually and/or collectively, of a wearable device including a display, cause the wearable device to:

display, using a first size based on a number of applications associated with a first virtual space and a first distance associated with a number of entries into the first virtual space, a first visual object corresponding to the first virtual space, in the display;

display, using a second size based on a number of applications associated with a second virtual space and a second distance associated with a number of entries into the second virtual space, a second visual object corresponding to the second virtual space, in the display; and display, in response to an input selecting one of the first visual object or the second visual object, at least a portion of a virtual space corresponding to a visual object selected by the input, in the display.

* * * * *